US009098591B2

(12) United States Patent
Hayashi et al.

(10) Patent No.: US 9,098,591 B2
(45) Date of Patent: Aug. 4, 2015

(54) SPATIO-TEMPORAL DATA MANAGEMENT SYSTEM, SPATIO-TEMPORAL DATA MANAGEMENT METHOD, AND MACHINE-READABLE STORAGE MEDIUM THEREOF

(71) Applicant: Hitachi, Ltd., Tokyo (JP)

(72) Inventors: Hideki Hayashi, Kodaira (JP); Akinori Asahara, Tachikawa (JP); Kiyohiro Obara, Hachioji (JP); Akiko Sato, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 13/782,675

(22) Filed: Mar. 1, 2013

(65) Prior Publication Data

US 2013/0339371 A1 Dec. 19, 2013

(30) Foreign Application Priority Data

Jun. 18, 2012 (JP) ................................. 2012-136855

(51) Int. Cl.
*G06F 17/30* (2006.01)
(52) U.S. Cl.
CPC ...... *G06F 17/3087* (2013.01); *G06F 17/30533* (2013.01)
(58) Field of Classification Search
CPC .............. G06F 17/30; G06F 17/30041; G06F 17/30044; G06F 17/30064; G06F 17/30061
USPC .................. 707/743, 758, 787–788
See application file for complete search history.

(56) References Cited

U.S. PATENT DOCUMENTS

| 4,700,712 | A | * | 10/1987 | Schmid ........................ 600/512 |
|---|---|---|---|---|
| 6,219,048 | B1 | * | 4/2001 | Miller et al. .................. 715/716 |
| 7,620,630 | B2 | * | 11/2009 | Lloyd et al. ............................ 1/1 |
| 8,140,451 | B1 | * | 3/2012 | Gargi et al. ..................... 706/12 |
| 8,291,075 | B1 | * | 10/2012 | Patel .............................. 709/224 |
| 2004/0080525 | A1 | * | 4/2004 | Miller et al. .................. 345/716 |
| 2006/0041560 | A1 | * | 2/2006 | Forman et al. .................. 707/10 |
| 2006/0101130 | A1 | * | 5/2006 | Adams et al. ................. 709/218 |
| 2006/0155398 | A1 | * | 7/2006 | Hoffberg et al. ................ 700/86 |
| 2007/0016582 | A1 | * | 1/2007 | Kawamura et al. .............. 707/7 |
| 2007/0019889 | A1 | * | 1/2007 | Miller et al. .................. 382/305 |
| 2007/0061735 | A1 | * | 3/2007 | Hoffberg et al. ............. 715/744 |
| 2008/0005651 | A1 | * | 1/2008 | Grefenstette et al. ......... 715/500 |
| 2008/0120129 | A1 | * | 5/2008 | Seubert et al. .................... 705/1 |
| 2010/0076990 | A1 | * | 3/2010 | Akamine et al. ............. 707/758 |

(Continued)

FOREIGN PATENT DOCUMENTS

JP          2004-062428 A       2/2004

*Primary Examiner* — Hanh Thai
(74) *Attorney, Agent, or Firm* — Foley & Lardner LLP

(57) ABSTRACT

It is provided a spatio-temporal data management system for managing time series data associated with a spatio-temporal region, comprising: a processor for executing a program; a memory for storing the program; and a storage device for storing the time series data. The processor segments the spatio-temporal region in time and space to generate a plurality of spatio-temporal segments, assigns, in consideration of temporal and spatial proximity of the plurality of spatio-temporal segments, identifiers for uniquely identifying the plurality of spatio-temporal segments, each of the identifiers being expressed with a one-dimensional integer value; and determines an arrangement of the time series data so that pieces of data of spatio-temporal segments that are close in the assigned identifiers are arranged close on the storage device.

13 Claims, 30 Drawing Sheets

(56) References Cited

U.S. PATENT DOCUMENTS

| | | | |
|---|---|---|---|
| 2010/0141804 A1* | 6/2010 | Morel et al. | 348/241 |
| 2010/0205541 A1* | 8/2010 | Rapaport et al. | 715/753 |
| 2010/0287207 A1* | 11/2010 | Motoyama | 707/803 |
| 2011/0167110 A1* | 7/2011 | Hoffberg et al. | 709/203 |
| 2011/0270674 A1* | 11/2011 | Cosman | 705/14.45 |
| 2011/0314330 A1* | 12/2011 | Morimura et al. | 714/26 |
| 2012/0150651 A1* | 6/2012 | Hoffberg et al. | 705/14.58 |
| 2012/0185172 A1* | 7/2012 | Barash et al. | 702/19 |
| 2012/0268623 A1* | 10/2012 | Morel et al. | 348/229.1 |
| 2012/0271847 A1* | 10/2012 | Watanabe et al. | 707/769 |

* cited by examiner

GRID TIME SERIES DATA

| TIME | SPACE | ATTRIBUTE VALUE |
|---|---|---|
| 0 | (0,0), (25,25) | 0 |
| 0 | (25, 0), (50, 25) | 0 |
| 0 | (0, 25), (25, 50) | 3 |
| 0 | (25, 25), (50, 50) | 3 |
| ... | ... | ... |
| 150 | (0, 0), (25, 25) | 3 |
| 150 | (25, 0), (50, 25) | 3 |
| 150 | (0, 25), (25, 50) | 9 |
| 150 | (25, 25), (50, 50) | 9 |
| ... | ... | ... |
| 300 | (0, 0), (25, 25) | 6 |
| 300 | (25, 0), (50, 25) | 6 |
| 300 | (0, 25), (25, 50) | 15 |
| 300 | (25, 25), (50, 50) | 15 |
| ... | ... | ... |

| DATA NAME | MANAGEMENT PARAMETER | VALUE |
|---|---|---|
| GRID TIME SERIES DATA | NUMBER OF BITS OF SPATIO-TEMPORAL ID | 8 |
| GRID TIME SERIES DATA | SPACE DIMENSION | 2 |
| GRID TIME SERIES DATA | SPACE UNIT | METERS |
| GRID TIME SERIES DATA | x-AXIS MINIMUM VALUE | 0 |
| GRID TIME SERIES DATA | x-AXIS MAXIMUM VALUE | 100 |
| GRID TIME SERIES DATA | x-AXIS UNIT SEGMENT WIDTH | 25 |
| GRID TIME SERIES DATA | y-AXIS MINIMUM VALUE | 0 |
| GRID TIME SERIES DATA | y-AXIS MAXIMUM VALUE | 100 |
| GRID TIME SERIES DATA | y-AXIS UNIT SEGMENT WIDTH | 25 |
| GRID TIME SERIES DATA | TIME UNIT | SECONDS |
| GRID TIME SERIES DATA | TIME PERIOD START TIME | 0 |
| GRID TIME SERIES DATA | TIME UNIT SEGMENT WIDTH | 100 |

*Fig.7*

GRID TIME SERIES DATA 112

| SPATIO-TEMPORAL ID | TIME SERIES DATA | ATTRIBUTE VALUE MIN | ATTRIBUTE VALUE MAX |
|---|---|---|---|
| 0 | (0, 0), (100, 2) | 0 | 2 |
| 1 | (0, 0), (100, 2) | 0 | 2 |
| 2 | (0, 3), (100, 7) | 3 | 7 |
| 3 | (0, 3), (100, 7) | 3 | 7 |
| ... | ... | ... | ... |
| 16 | (100, 2), (150, 3), (200, 4) | 2 | 4 |
| 17 | (100, 2), (150, 3), (200, 4) | 2 | 4 |
| 18 | (100, 7), (150, 9), (200, 11) | 7 | 11 |
| 19 | (100, 7), (150, 9), (200, 11) | 7 | 11 |
| ... | ... | ... | ... |
| 32 | (200, 4), (300, 6) | 4 | 6 |
| 33 | (200, 4), (300, 6) | 4 | 6 |
| 34 | (200, 11), (300, 15) | 11 | 15 |
| 35 | (200, 11), (300, 15) | 11 | 15 |
| ... | ... | ... | ... |

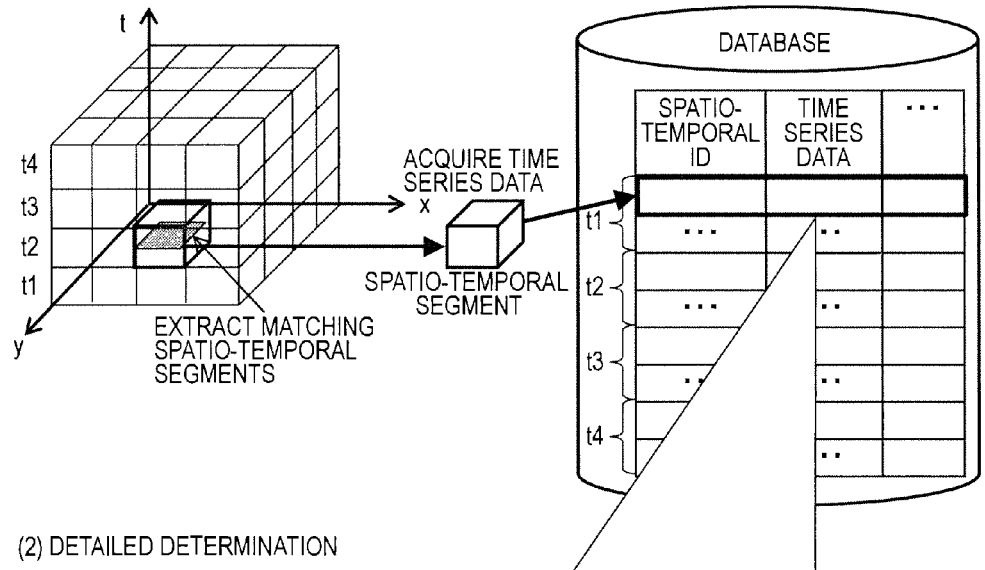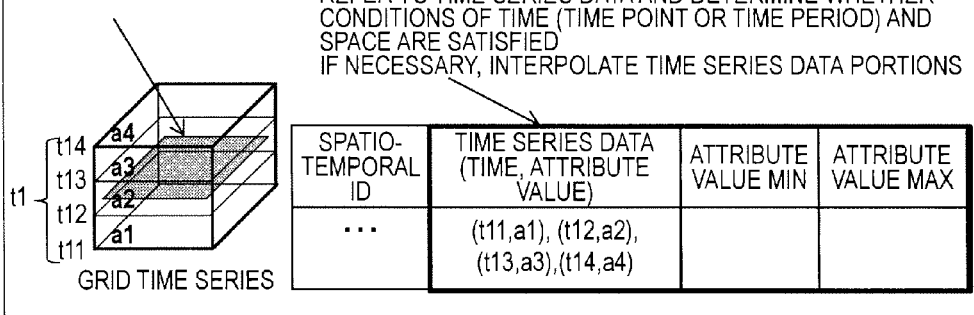
Fig. 11

SEARCH CONDITIONS
· TEMPORAL CONDITION: TIME t = 50
· SPATIAL CONDITION: RECTANGLE (x, y) = (0, 0) - (50, 50)
· RESULT ATTRIBUTES: GRID SPACE RANGE, TIME SERIES DATA

ROUGH DETERMINATION
· ACQUIRE RECORDS THAT SATISFY 0 ≤ (SPATIO-TEMPORAL ID) ≤ 3

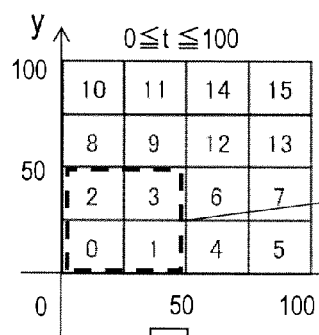

| SPATIO-TEMPORAL ID | TIME SERIES DATA | ATTRIBUTE VALUE MIN | ATTRIBUTE VALUE MAX |
|---|---|---|---|
| 0 | (0, 0), (100, 2) | 0 | 2 |
| 1 | (0, 0), (100, 2) | 0 | 2 |
| 2 | (0, 3), (100, 7) | 3 | 7 |
| 3 | (0, 3), (100, 7) | 3 | 7 |

DETAILED DETERMINATION
· DETERMINE WHETHER RESULTS OF ROUGH DETERMINATION SATISFY SEARCH CONDITIONS
· AS A RESULT, ALL RECORDS SATISFY SEARCH CONDITIONS

SEARCH RESULTS

| GRID SPACE RANGE | TIME SERIES DATA |
|---|---|
| (0,0), (25,25) | (50, 1) |
| (25, 0), (50, 25) | (50, 1) |
| (0, 25), (25, 50) | (50, 4) |
| (25, 25), (50, 50) | (50, 4) |

*Fig.14*

SEARCH CONDITIONS
· TEMPORAL CONDITION: TIME $t$ = [50, 150]
· SPATIAL CONDITION: RECTANGLE $(x, y)$ = (0, 0) - (50, 50)
· RESULT ATTRIBUTES: GRID SPACE RANGE, TIME SERIES DATA

ROUGH DETERMINATION
ACQUIRE RECORDS THAT SATISFY 0≤(SPATIO-TEMPORAL ID)≤3 OR
16≤(SPATIO-TEMPORAL ID)≤19

| SPATIO-TEMPORAL ID | TIME SERIES DATA | ATTRIBUTE VALUE MIN | ATTRIBUTE VALUE MAX |
|---|---|---|---|
| 0 | (0, 0), (100, 2) | 0 | 2 |
| 1 | (0, 0), (100, 2) | 0 | 2 |
| 2 | (0, 3), (100, 7) | 3 | 7 |
| 3 | (0, 3), (100, 7) | 3 | 7 |
| 16 | (100, 2), (150, 3), (200, 4) | 2 | 4 |
| 17 | (100, 2), (150, 3), (200, 4) | 2 | 4 |
| 18 | (100, 7), (150, 9), (200, 11) | 7 | 11 |
| 19 | (100, 7), (150, 9), (200, 11) | 7 | 11 |

DETAILED DETERMINATION
· DETERMINE WHETHER RESULTS OF ROUGH DETERMINATION
SATISFY SEARCH CONDITIONS
→ALL RECORDS SATISFY SEARCH CONDITIONS

SEARCH RESULTS

| GRID SPACE RANGE | TIME SERIES DATA |
|---|---|
| RECTANGLE(0,0), (25,25) | (50, 1), (100, 2), (150, 3) |
| RECTANGLE (25, 0), (50, 25) | (50, 1), (100, 2), (150, 3) |
| RECTANGLE(0, 25), (25, 50) | (50, 4), (100, 7), (150, 9) |
| RECTANGLE (25, 25), (50, 50) | (50, 4), (100, 7), (150, 9) |

*Fig.15*

SEARCH CONDITIONS
· TEMPORAL CONDITION: TIME $t$ = 50
· SPATIAL CONDITION: RECTANGLE $(x, y)$ = (0, 0) - (50, 50)
· ATTRIBUTE CONDITION: ATTRIBUTE VALUE ≤ 1
· RESULT ATTRIBUTES: GRID SPACE RANGE, TIME SERIES DATA

ROUGH DETERMINATION
ACQUIRE RECORDS THAT SATISFY 0 ≤ (SPATIO-TEMPORAL ID) ≤ 3 AND
(ATTRIBUTE VALUE MAX) ≤ 1

| SPATIO-TEMPORAL ID | TIME SERIES DATA | ATTRIBUTE VALUE MIN | ATTRIBUTE VALUE MAX |
|---|---|---|---|
| 0 | (0, 0), (100, 2) | 0 | 2 |
| 1 | (0, 0), (100, 2) | 0 | 2 |

DETAILED DETERMINATION

SEARCH RESULTS

| GRID SPACE RANGE | TIME SERIES DATA |
|---|---|
| RECTANGLE(0,0), (25,25) | (50, 1) |
| RECTANGLE(25, 0), (50, 25) | (50, 1) |

Fig.16

POINT TIME SERIES DATA

| TIME | SPACE | OBJECT ID |
|---|---|---|
| 0 | (10, 10) | 1 |
| 0 | (15, 15) | 2 |
| ... | ... | ... |
| 150 | (10, 40) | 1 |
| 150 | (45, 15) | 2 |
| ... | ... | ... |
| 300 | (40, 40) | 1 |
| 300 | (45, 45) | 2 |
| ... | ... | ... |

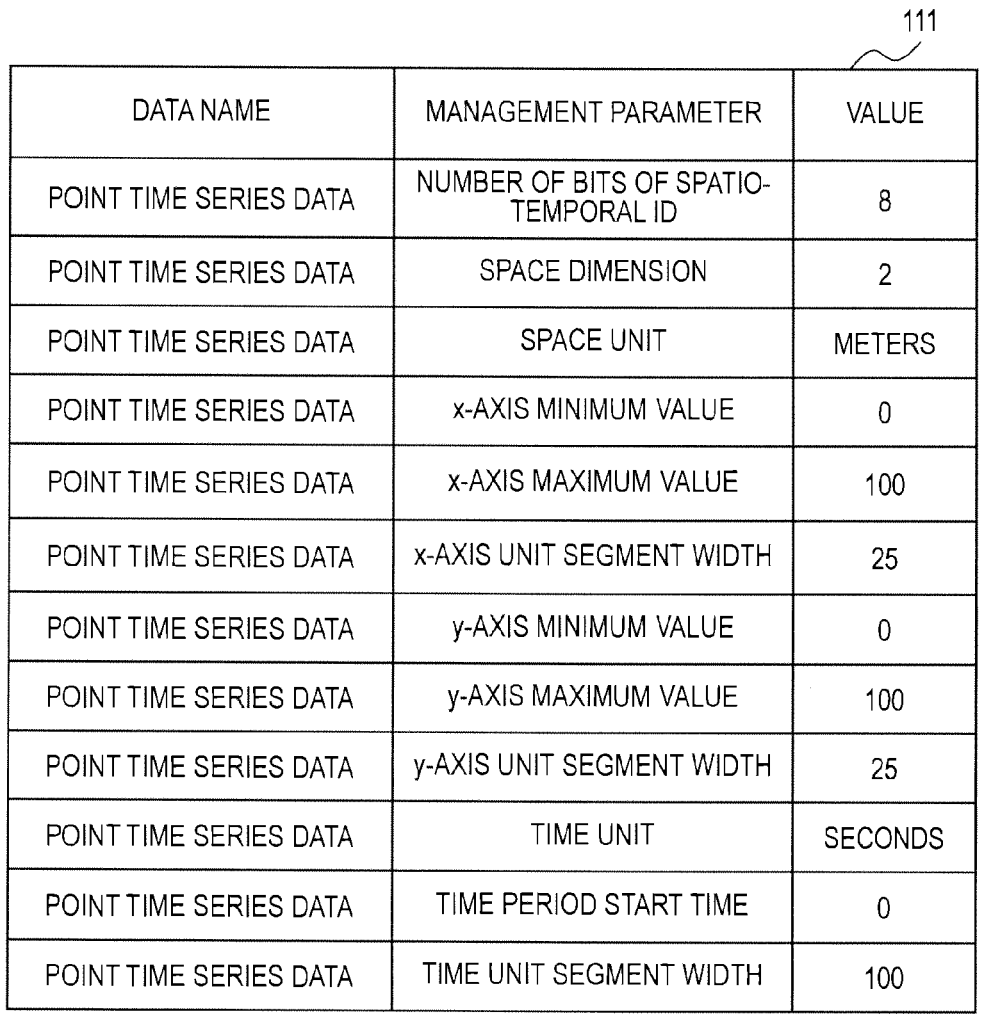

| DATA NAME | MANAGEMENT PARAMETER | VALUE |
|---|---|---|
| POINT TIME SERIES DATA | NUMBER OF BITS OF SPATIO-TEMPORAL ID | 8 |
| POINT TIME SERIES DATA | SPACE DIMENSION | 2 |
| POINT TIME SERIES DATA | SPACE UNIT | METERS |
| POINT TIME SERIES DATA | x-AXIS MINIMUM VALUE | 0 |
| POINT TIME SERIES DATA | x-AXIS MAXIMUM VALUE | 100 |
| POINT TIME SERIES DATA | x-AXIS UNIT SEGMENT WIDTH | 25 |
| POINT TIME SERIES DATA | y-AXIS MINIMUM VALUE | 0 |
| POINT TIME SERIES DATA | y-AXIS MAXIMUM VALUE | 100 |
| POINT TIME SERIES DATA | y-AXIS UNIT SEGMENT WIDTH | 25 |
| POINT TIME SERIES DATA | TIME UNIT | SECONDS |
| POINT TIME SERIES DATA | TIME PERIOD START TIME | 0 |
| POINT TIME SERIES DATA | TIME UNIT SEGMENT WIDTH | 100 |

Fig.19

POINT TIME SERIES DATA 112

| SPATIO-TEMPORAL ID | OBJECT ID | TIME SERIES DATA |
|---|---|---|
| 0 | 1 | (0, 10, 10), (75, 10, 25) |
| 0 | 2 | (0, 15, 15), (50, 25, 15) |
| 1 | 2 | (50, 25, 15), (100, 35, 15) |
| 2 | 1 | (75, 10, 25), (100, 10, 30) |
| 18 | 1 | (100, 10, 30), (150, 10, 40), (200, 20, 40) |
| 19 | 2 | (100, 35, 15), (150, 45, 15), (200, 45, 25) |
| 34 | 1 | (200, 20, 40), (225, 25, 40) |
| 35 | 1 | (225, 25, 40), (300, 40, 40) |
| 35 | 2 | (200, 45, 25), (300, 45, 45) |
| ... | ... | ... |

(1) ROUGH DETERMINATION
  SEARCH CONDITIONS
  • TEMPORAL CONDITION: TIME (TIME POINT / TIME PERIOD)
  • SPATIAL CONDITION: SPACE RANGE
  • ATTRIBUTE CONDITION
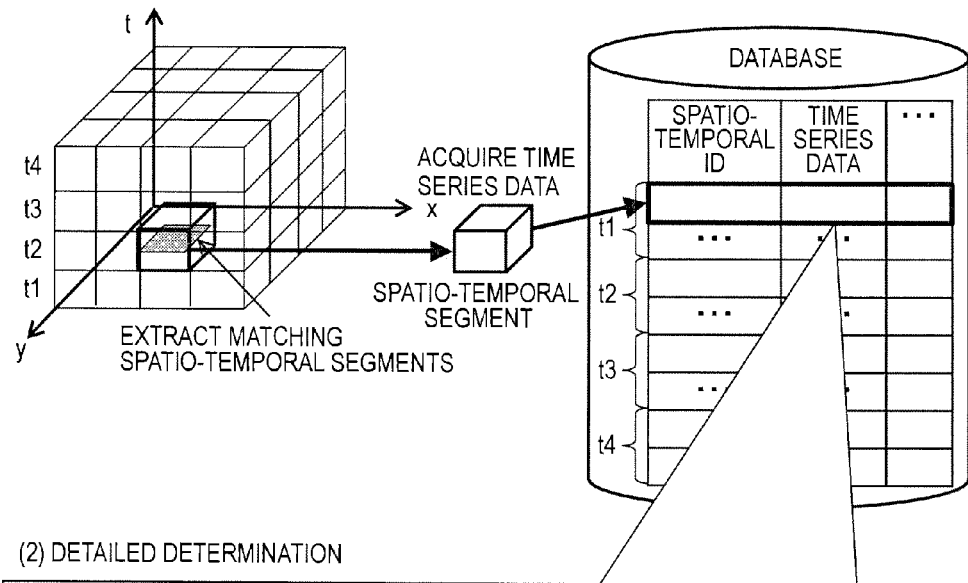
(2) DETAILED DETERMINATION
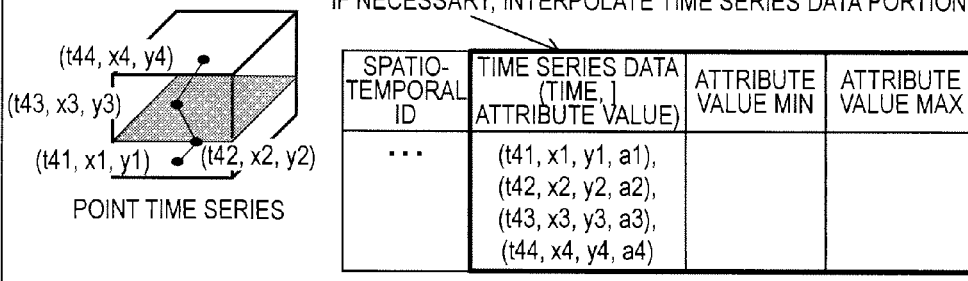
*Fig.22*

SEARCH CONDITIONS
· TEMPORAL CONDITION: TIME $t$ = 50
· SPATIAL CONDITION: RECTANGLE $(x, y)$ = (0, 0) - (50, 50)
· RESULT ATTRIBUTES: OBJECT ID, TIME SERIES DATA

ROUGH DETERMINATION
ACQUIRE RECORDS THAT SATISFY 0 ≤ (SPATIO-TEMPORAL ID) ≤ 3

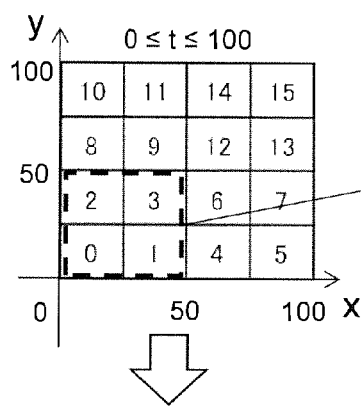

| SPATIO-TEMPORAL ID | OBJECT ID | TIME SERIES DATA |
|---|---|---|
| 0 | 1 | (0, 10, 10), (75, 10, 25) |
| 0 | 2 | (0, 15, 15), (50, 25, 15) |
| 1 | 2 | (50, 25, 15), (100, 35, 15) |
| 2 | 1 | (75, 10, 25), (100, 10, 30) |

DETAILED DETERMINATION
· DETERMINE WHETHER RESULTS OF ROUGH DETERMINATION SATISFY SEARCH CONDITIONS
  →RECORD OF (SPATIO-TEMPORAL ID, OBJECT ID) = (2, 1) DOES NOT SATISFY TEMPORAL CONDITIONS REFERRING TO TIME SERIES DATA, AND HENCE IS EXCLUDED FROM RESULTS

SEARCH RESULTS

| OBJECT ID | TIME SERIES DATA |
|---|---|
| 1 | (50, 10, 20) |
| 2 | (50, 25, 15) |

*Fig.23*

SEARCH CONDITIONS
• TEMPORAL CONDITION: TIME $t$ = [50, 150]
• SPATIAL CONDITION: RECTANGLE $(x, y)$ = (0, 0) - (50, 50)
• RESULT ATTRIBUTES: OBJECT ID, TIME SERIES DATA
ROUGH DETERMINATION
ACQUIRE RECORDS THAT SATISFY 0 ≤ (SPATIO-TEMPORAL ID) ≤ 3 OR
16 ≤ (SPATIO-TEMPORAL ID) ≤ 19
| TIME SERIES DATA | OBJECT ID | TIME SERIES DATA |
|---|---|---|
| 0 | 1 | (0, 10, 10), (75, 10, 25) |
| 0 | 2 | (0, 15, 15), (50, 25, 15) |
| 1 | 2 | (50, 25, 15), (100, 35, 15) |
| 2 | 1 | (75, 10, 25), (100, 10, 30) |
| 18 | 1 | (100, 10, 30), (150, 10, 40), (200, 20, 40) |
| 19 | 2 | (100, 35, 15), (150, 45, 15), (200, 45, 25) |
DETAILED DETERMINATION
SEARCH RESULTS
| OBJECT ID | TIME SERIES DATA |
|---|---|
| 1 | (50, 10, 20), (75, 10, 25), (100, 10, 30), (150, 10, 40) |
| 2 | (50, 25, 15), (100, 35, 15), (150, 45, 15) |
*Fig.24*

SEARCH CONDITIONS
- TEMPORAL CONDITION: TIME $t$ = 50
- SPATIAL CONDITION: RECTANGLE $(x, y)$ = (0, 0) - (50, 50)
- ATTRIBUTE CONDITION: (ATTRIBUTE VALUE OF GRID TIME SERIES DATA) ≥ 1
- RESULT ATTRIBUTES: OBJECT ID, POINT TIME SERIES DATA

ROUGH DETERMINATION
ACQUIRE RECORDS THAT SATISFY:
0 ≤ (SPATIO-TEMPORAL ID OF GRID TIME SERIES DATA) ≤ 3; AND
(SPATIO-TEMPORAL ID OF GRID TIME SERIES DATA) = (SPATIO-TEMPORAL ID
OF POINT TIME SERIES DATA); AND
(ATTRIBUTE VALUE MIN OF GRID TIME SERIES DATA) ≥ 1

RESULTS OF ROUGH DETERMINATION

| SPATIO-TEMPORAL ID | GRID TIME SERIES DATA | ATTRIBUTE VALUE MIN | ATTRIBUTE VALUE MAX | SPATIO-TEMPORAL ID | OBJECT ID | POINT TIME SERIES DATA |
|---|---|---|---|---|---|---|
| 0 | (0, 0), (100, 2) | 0 | 2 | 0 | 1 | (0, 10, 10), (75, 10, 25) |
| 0 | (0, 0), (100, 2) | 0 | 2 | 0 | 2 | (0, 15, 15), (50, 25, 15) |
| 1 | (0, 0), (100, 2) | 0 | 2 | 1 | 2 | (50, 25, 15), (100, 35, 15) |
| 2 | (0, 3), (100, 7) | 3 | 7 | 2 | 1 | (75, 10, 25), (100, 10, 30) |

GRID TIME SERIES DATA — POINT TIME SERIES DATA

*Fig.26A*

DETAILED DETERMINATION

REFER TO "GRID TIME SERIES DATA" AND CALCULATE ATTRIBUTE VALUE
AT TIME 50 BY LINEAR INTERPOLATION.
→ALL RECORDS OF ROUGH DETERMINATION SATISFY ATTRIBUTE CONDITION
  ((ATTRIBUTE VALUE OF GRID TIME SERIES DATA) ≥ 1).

| SPATIO-TEMPORAL ID | TIME SERIES DATA |
|---|---|
| 0 | (50, 1) |
| 0 | (50, 1) |
| 1 | (50, 1) |
| 2 | (50, 2) |

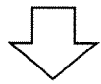

REFER TO "POINT TIME SERIES DATA" AND CALCULATE COORDINATE
VALUES AT TIME 50 BY LINEAR INTERPOLATION.

| SPATIO-TEMPORAL ID | OBJECT ID | TIME SERIES DATA |
|---|---|---|
| 0 | 1 | (50, 10, 20) |
| 0 | 2 | (50, 25, 15) |
| 1 | 2 | (50, 25, 15) |
| 2 | 1 | (50, 10, 20) |

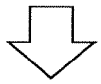

RESULTS OF DETAILED DETERMINATION
ELIMINATE REDUNDANCY AND GENERATE RESULT RECORDS

| OBJECT ID | POINT TIME SERIES DATA |
|---|---|
| 1 | (50, 10, 20) |
| 2 | (50, 25, 15) |

*Fig.26B*

| DATA NAME | MANAGEMENT PARAMETER | VALUE |
|---|---|---|
| POINT TIME SERIES DATA | NUMBER OF BITS OF SPATIO-TEMPORAL ID | 8 |
| POINT TIME SERIES DATA | SPACE DIMENSION | 2 |
| POINT TIME SERIES DATA | SPACE UNIT | METERS |
| POINT TIME SERIES DATA | x-AXIS MINIMUM VALUE | 0 |
| POINT TIME SERIES DATA | x-AXIS MAXIMUM VALUE | 100 |
| POINT TIME SERIES DATA | x-AXIS UNIT SEGMENT WIDTH | 50 |
| POINT TIME SERIES DATA | y-AXIS MINIMUM VALUE | 0 |
| POINT TIME SERIES DATA | y-AXIS MAXIMUM VALUE | 100 |
| POINT TIME SERIES DATA | y-AXIS UNIT SEGMENT WIDTH | 50 |
| POINT TIME SERIES DATA | TIME UNIT | SECONDS |
| POINT TIME SERIES DATA | TIME PERIOD START TIME | 0 |
| POINT TIME SERIES DATA | TIME UNIT SEGMENT WIDTH | 100 |

Fig.27A

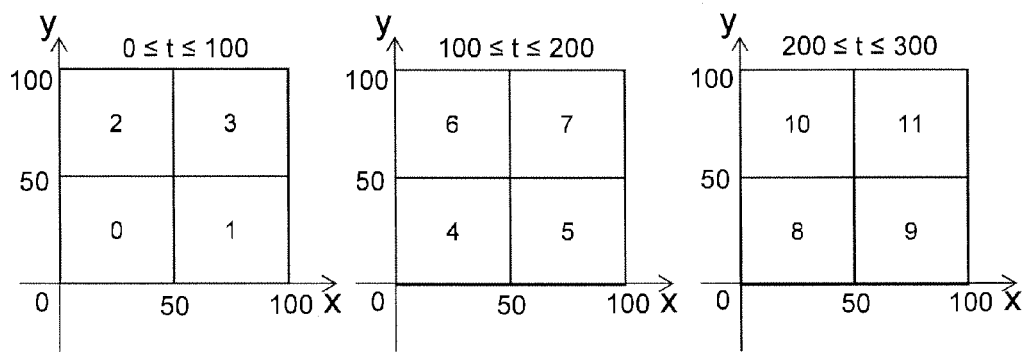

Fig.27B

POINT TIME SERIES DATA 112

| SPATIO-TEMPORAL ID | OBJECT ID | TIME SERIES DATA |
|---|---|---|
| 0 | 1 | (0, 10, 10), (100, 10, 30) |
| 0 | 2 | (0, 15, 15), (100, 35, 15) |
| 4 | 1 | (100, 10, 30), (150, 10, 40), (200, 20, 40) |
| 4 | 2 | (100, 35, 15), (150, 45, 15), (200, 45, 25) |
| 8 | 1 | (200, 20, 40), (300, 40, 40) |
| 8 | 2 | (200, 45, 25), (300, 45, 45) |
| ... | ... | ... |

*Fig.27C*

SEARCH CONDITIONS
・SEARCH FROM: GRID TIME SERIES DATA, POINT TIME SERIES DATA
・TEMPORAL CONDITION: TIME $t = 50$
・SPATIAL CONDITION: RECTANGLE $(x, y) = (0, 0) - (50, 50)$
・ATTRIBUTE CONDITION: (ATTRIBUTE VALUE OF GRID TIME SERIES DATA) $\geq 1$
・RESULT ATTRIBUTES: OBJECT ID, POINT TIME SERIES DATA

ROUGH DETERMINATION
ACQUIRE RECORDS THAT SATISFY FOLLOWING CONDITIONS:
    $0 \leq$ (SPATIO-TEMPORAL ID OF GRID TIME SERIES DATA) $\leq 3$; AND
    (SPATIO-TEMPORAL ID OF GRID TIME SERIES DATA & $[00001111]_2$)/4 =
        (SPATIO-TEMPORAL ID OF POINT TIME SERIES DATA & $[00001111]_2$); AND
    (ATTRIBUTE VALUE MIN OF GRID TIME SERIES DATA)$\geq 1$

RESULTS OF ROUGH DETERMINATION

| SPATIO-TEMPORAL ID | GRID TIME SERIES DATA | ATTRIBUTE VALUE MIN | ATTRIBUTE VALUE MAX | SPATIO-TEMPORAL ID | OBJECT ID | POINT TIME SERIES DATA |
|---|---|---|---|---|---|---|
| 0 | (0, 0), (100, 2) | 0 | 2 | 0 | 1 | (0, 10, 10), (100, 10, 30) |
| 0 | (0, 0), (100, 2) | 0 | 2 | 0 | 2 | (0, 15, 15), (100, 35, 15) |
| 1 | (0, 0), (100, 2) | 0 | 2 | 0 | 1 | (0, 10, 10), (100, 10, 30) |
| 1 | (0, 0), (100, 2) | 0 | 2 | 0 | 2 | (0, 15, 15), (100, 35, 15) |

⎵ GRID TIME SERIES DATA     ⎵ POINT TIME SERIES DATA

*Fig.28A*

DETAILED DETERMINATION
REFER TO "GRID TIME SERIES DATA" AND CALCULATE ATTRIBUTE VALUE AT TIME 50.
→ALL RECORDS OF ROUGH DETERMINATION SATISFY ATTRIBUTE CONDITION
   ((ATTRIBUTE VALUE OF GRID TIME SERIES DATA) ≥ 1).

| SPATIO-TEMPORAL ID | TIME SERIES DATA |
|---|---|
| 0 | (50, 1) |
| 0 | (50, 1) |
| 1 | (50, 1) |
| 1 | (50, 1) |
| 2 | (50, 5) |
| 2 | (50, 5) |

REFER TO "POINT TIME SERIES DATA" AND CALCULATE COORDINATE
VALUES AT TIME 50 BY LINEAR INTERPOLATION.

| SPATIO-TEMPORAL ID | OBJECT ID | TIME SERIES DATA |
|---|---|---|
| 0 | 1 | (50, 10, 20) |
| 0 | 2 | (50, 25, 15) |
| 0 | 1 | (50, 10, 20) |
| 0 | 2 | (50, 25, 15) |
| 0 | 1 | (50, 10, 20) |
| 0 | 2 | (50, 25, 15) |

RESULTS OF DETAILED DETERMINATION
ELIMINATE REDUNDANCY AND GENERATE RESULT RECORDS

| OBJECT ID | POINT TIME SERIES DATA |
|---|---|
| 1 | (50, 10, 20) |
| 2 | (50, 25, 15) |

*Fig.28B*

SPATIO-TEMPORAL DATA MANAGEMENT SYSTEM, SPATIO-TEMPORAL DATA MANAGEMENT METHOD, AND MACHINE-READABLE STORAGE MEDIUM THEREOF

CLAIM OF PRIORITY

The present application claims priority from Japanese patent application JP 2012-136855 filed on Jun. 18, 2012, the content of which is hereby incorporated by reference into this application.

BACKGROUND OF THE INVENTION

This invention relates to a spatio-temporal data management system for managing spatio-temporal data associated with time and space, and more particularly, to a technology for speeding up search processing with conditions of time and space.

Of data that changes with time and space, data that changes continuously with time includes the following data.

(1) Grid Time Series Data

Grid time series data is data represented by quadrilateral (planar or cubic) grids, each of the grids being given an attribute value, on a change in environmental distribution, for example, air temperature, tsunami, flood, and $CO_2$, in which the attribute value given to the grid changes with time.

(2) Point time series data

Point time series data is data represented by time series data including a time and coordinate values on a positional change of a moving object, for example, a flow of people, traffic, and goods, in which the coordinate values change with time.

The grid time series data and the point time series data are data obtained from a simulator or a sensor and are large in amount with a significant number of records. When such large amount of spatio-temporal data is searched at high speed with conditions of time and space, there has been proposed a method involving segmenting a spatio-temporal region to generate spatio-temporal segments, and associating the spatio-temporal segments and spatio-temporal data.

For example, JP 2004-62428 A discloses a technology in which time-space three-dimensional information consisting of two-dimensional (or three-dimensional) area information and time information (or period information) is added or related to data for retrieval, and in which data with time-space three-dimensional information including position and time information as search keys in time and space is output as the retrieval result.

SUMMARY OF THE INVENTION

When the technology described in JP 2004-62428 A is applied to the large amount of spatio-temporal data that changes continuously with time as described above, spatio-temporal search processing with the conditions of time and space takes longer time. In particular, the following problems arise.

Firstly, data sizes of space region information and time region information that represent the spatio-temporal segments are large, and it takes time to acquire substantial data in the spatio-temporal data search processing. In addition, the size of the index data for searching the spatio-temporal data at high speed is large, and hence it takes time to search the index data in the spatio-temporal data search processing.

Secondly, the spatio-temporal data is physically stored without taking temporal proximity and spatial proximity into consideration, and hence it takes time to acquire substantial data in the spatio-temporal data search processing.

Thirdly, the continuous change with time of the spatio-temporal data is not taken into consideration. Therefore, in order to adapt to the continuous change with time, interpolation processing needs to be performed at the time of the search, which takes time.

Fourthly, specifying a condition of an attribute in addition to the conditions of time and space is not taken into consideration. Therefore, when the attribute condition is added for the search, the search processing takes time.

Fifthly, the relationship (intersection test) of a plurality of pieces of the spatio-temporal data is not taken into consideration.

It is an object of this invention to provide a spatio-temporal data management system capable of carrying out a search at high speed.

The representative one of inventions disclosed in this application is outlined as follows. There is provided a spatio-temporal data management system for managing time series data associated with a spatio-temporal region, comprising: a processor for executing a program; a memory for storing the program; and a storage device for storing the time series data. The processor segments the spatio-temporal region in time and space to generate a plurality of spatio-temporal segments, assigns, in consideration of temporal and spatial proximity of the plurality of spatio-temporal segments, identifiers for uniquely identifying the plurality of spatio-temporal segments, each of the identifiers being expressed with a one-dimensional integer value; and determines an arrangement of the time series data so that pieces of data of spatio-temporal segments that are close in the assigned identifiers are arranged close on the storage device.

According to the exemplary embodiment of this invention, the spatio-temporal data may be searched at high speed.

BRIEF DESCRIPTION OF THE DRAWINGS

The present invention can be appreciated by the description which follows in conjunction with the following figures, wherein:

FIG. 7 is a diagram illustrating an example of spatio-temporal management data according to the first embodiment of this invention;

FIG. 11 is a diagram illustrating an outline of search of the grid time series data according to the first embodiment of this invention;

FIG. 14 is a diagram illustrating an example of a search for a spatio-temporal range of the grid time series data when a "time point" is specified as a temporal condition according to the first embodiment of this invention;

FIG. 15 is a diagram illustrating an example of a search for a spatio-temporal range of the grid time series data when a "time period" is specified as a temporal condition according to the first embodiment of this invention;

FIG. 16 is a diagram illustrating an example of a search for a spatio-temporal range of the grid time series data when a attribute condition is specified according to the first embodiment of this invention;

FIG. 19 is a diagram illustrating an example of spatio-temporal management data according to the second embodiment of this invention;

FIG. 22 is a diagram illustrating an outline of search of the point time series data according to the second embodiment of this invention;

FIG. 23 is a diagram illustrating an example of a search for a spatio-temporal range of the point time series data when a "time point" is specified as a temporal condition according to the second embodiment of this invention;

FIG. 24 is a diagram illustrating an example of a search for a spatio-temporal range of the point time series data when a "time period" is specified as a temporal condition according to the second embodiment of this invention;

FIGS. 26A and 26B are diagrams illustrating an example of the intersection test for a case where the different kinds of spatio-temporal data have the same segment granularity of spatio-temporal regions according to the third embodiment of this invention;

FIG. 27A is a diagram illustrating an example of spatio-temporal management data according to the third embodiment of this invention;

FIG. 27B is a diagram illustrating an example of a spatio-temporal ID given to a spatio-temporal segment according to the third embodiment of this invention;

FIG. 27C is a diagram illustrating a configuration example of the spatio-temporal data to which point time series data is registered according to the third embodiment of this invention; and FIGS. 28A and 28B are diagrams illustrating an example of the intersection test for a case where the different kinds of spatio-temporal data have the same segment granularity of the spatio-temporal regions according to the third embodiment of this invention.

DETAILED DESCRIPTION OF THE PREFERRED EMBODIMENTS

First Embodiment

Figure 1:
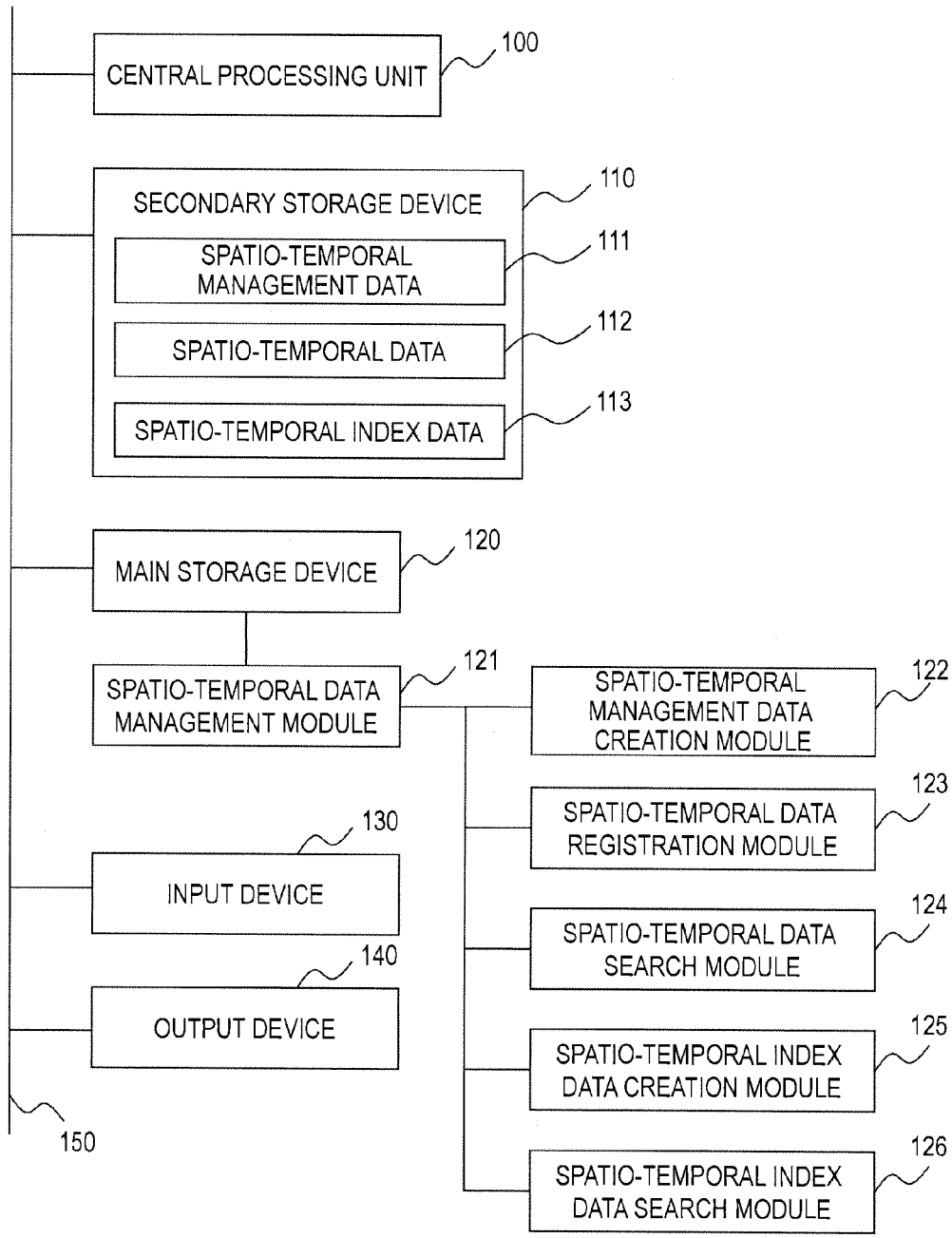
FIG. 1 is a block diagram illustrating a hardware configuration of a spatio-temporal data management system according to a first embodiment of this invention.

FIG. 1 is a block diagram illustrating a hardware configuration of a spatio-temporal data management system according to a first embodiment of this invention.

The spatio-temporal data management system according to this embodiment is a computer including a central processing unit 100, a secondary storage device 110, a main storage device 120, an input device 130, and an output device 140, in which the central processing unit 100, the secondary storage device 110, the main storage device 120, the input device 130, and the output device 140 are connected via a bus 150.

The central processing unit 100 is a processor for executing programs stored in the main storage device 120.

The secondary storage device 110 is a non-volatile storage device having a large capacity, for example, a magnetic storage device or a flash memory, and stores data used by the central processing unit 100 at the time of executing the programs. To be specific, the secondary storage device 110 stores spatio-temporal management data 111, spatio-temporal data 112, and spatio-temporal index data 113.

The spatio-temporal management data 111 is data for managing the spatio-temporal data 112 and is illustrated in detail in FIG. 7.

Figure 3:
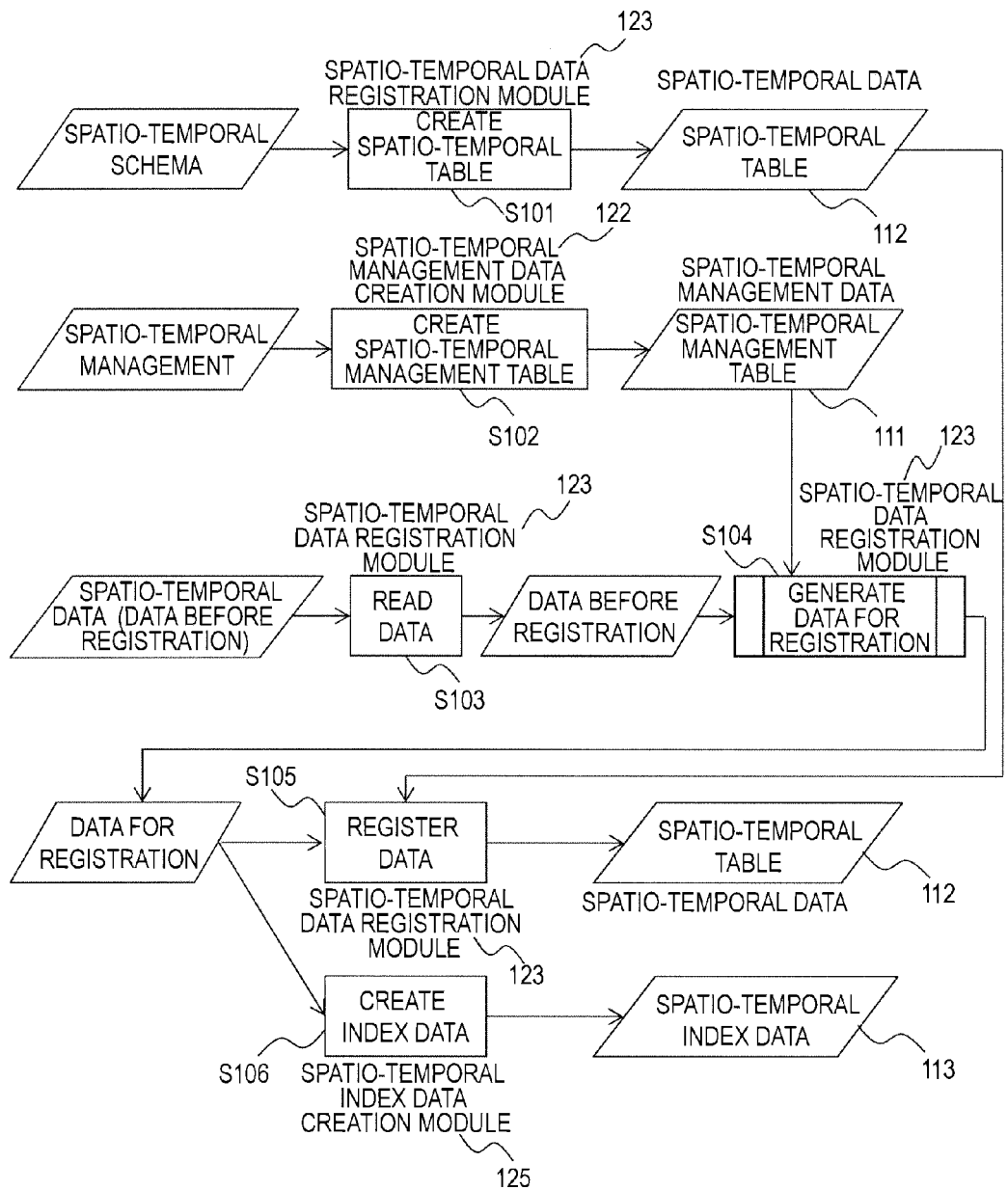
FIG. 3 is a flow chart of processing of registering the spatio-temporal data according to the first embodiment of this invention.
Figures 9, 10:
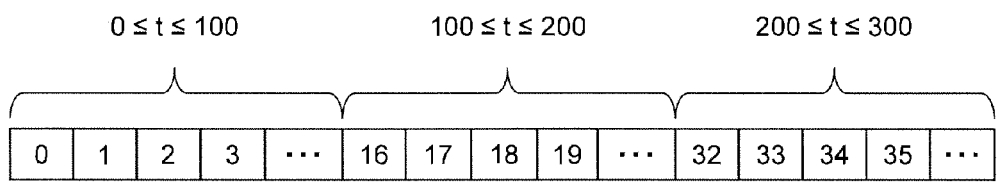
FIG. 9 is a diagram illustrating a configuration example of the spatio-temporal data to which grid time series data is registered according to the first embodiment of this invention.
FIG. 10 is a diagram illustrating a physical arrangement of the grid time series data according to the first embodiment of this invention.

As illustrated in FIG. 9, the spatio-temporal data 112 includes the fields of spatio-temporal ID and time series data and is constituted of a spatio-temporal table in the form of a table, for example. The spatio-temporal table may include a minimum value and a maximum value of attribute values as needed. The spatio-temporal data 112 also includes a schema of the spatio-temporal data. As illustrated in FIG. 3, the schema of the spatio-temporal data includes a column name and a data type.

The spatio-temporal index data 113 is an index for searching the spatio-temporal data (record numbers and addresses at which records are stored) with the spatio-temporal ID as a key, and may be a B-tree index, for example.

The main storage device 120 is a high-speed and volatile storage device such as a dynamic random access memory (DRAM), and stores an operating system (OS) and application programs. The central processing unit 100 executes the operating system to realize a fundamental function of the computer, and executes the application programs to realize functions provided by the computer.

To be specific, the main storage device 120 stores programs for implementing a spatio-temporal data management module 121, a spatio-temporal management data creation module 122, a spatio-temporal data registration module 123, a spatio-temporal data search module 124, a spatio-temporal index data creation module 125, and a spatio-temporal index data search module 126.

The spatio-temporal data management module 121 manages the spatio-temporal data 112 (and is a database management system, for example). The spatio-temporal management data creation module 122 creates the spatio-temporal management data 111 based on the input spatio-temporal management data. The spatio-temporal data registration module 123 creates the spatio-temporal data 112 based on the input spatio-temporal data.

The spatio-temporal data search module 124 refers to the spatio-temporal data 112 and executes search processing (rough determination and detailed determination). The spatio-temporal index data creation module 125 generates index data based on spatio-temporal data for registration, and registers the generated index data to the spatio-temporal index data 113. The spatio-temporal index data search module 126 refers to the spatio-temporal index data 113 and executes the search processing (rough determination).

It should be noted that the secondary storage device 110 may store the programs to be executed by the central processing unit 100. In this case, the programs are read from the secondary storage device 110, loaded on the main storage device 120, and executed by the central processing unit 100.

The input device 130 is a user interface such as a keyboard or a mouse. The output device 140 is a user interface such as a display device or a printer.

It should be noted that the spatio-temporal data management system may include a communication interface for coupling to a network and controlling communication with another device. In this case, the spatio-temporal data management system is coupled to a terminal via the communication interface, and the terminal includes the input device 130 and the output device 140 so that the spatio-temporal data management system processes the spatio-temporal data in response to a request from the terminal and outputs the processing result to the terminal.

The spatio-temporal data management system may be physically constructed on one computer, or may be constructed on a logical section physically configured on at least one computer.

It should be noted that the programs to be executed by the central processing unit 100 are provided to the computer via a non-volatile storage medium or a network. Therefore, it is preferred that the computer include an interface for reading the storage medium (such as CD-ROM or flash memory).

(Processing of Registering Grid Time Series Data)

Figure 2:
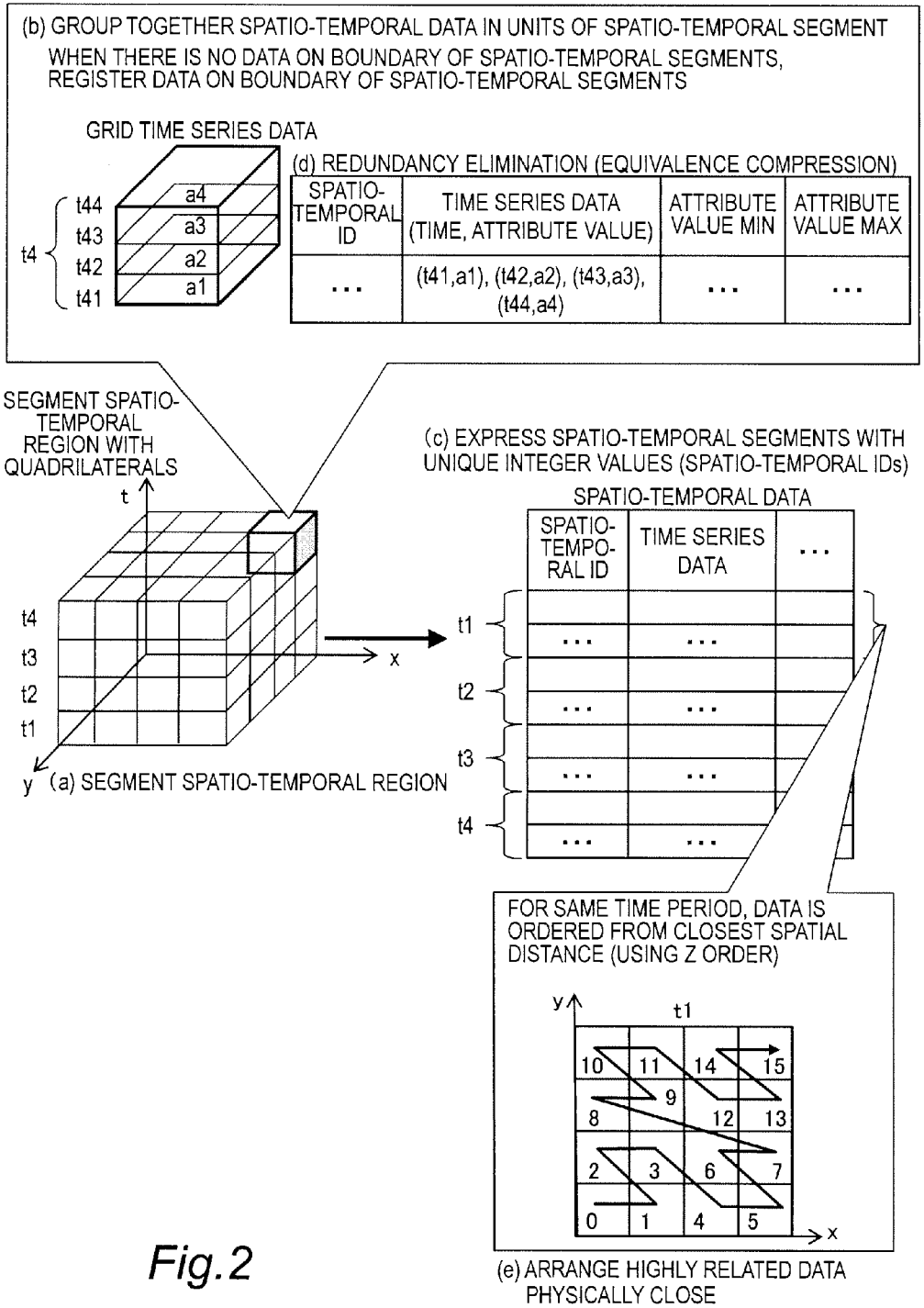
FIG. 2 is a diagram illustrating an outline of processing of registering the spatio-temporal data according to the first embodiment of this invention.

FIG. 2 is a diagram illustrating an outline of processing of registering the spatio-temporal data according to the first embodiment of this invention.

The spatio-temporal data in this embodiment is grid time series data which is spatially segmented by grids and in which each spatio-temporal segment includes time series data.

First, as illustrated in FIG. 2(*a*), before registering the spatio-temporal data, a spatio-temporal region is segmented in accordance with the spatio-temporal management data 111 input by a user, to thereby define the spatio-temporal segments. Each spatio-temporal segment is associated with the time series data. It should be noted that as illustrated in FIG. 2(*b*), the grid time series data may include a plurality of attribute values (a1 to a4) in one spatio-temporal segment. The plurality of attribute values include the plurality of attribute values included in the one spatio-temporal segment, or when there is no data on a boundary of the spatio-temporal segments, data registered on the boundary of the spatio-temporal segments by interpolation using adjacent data.

Thereafter, the spatio-temporal ID of each piece of the spatio-temporal data is calculated, and as illustrated in FIG. 2(*c*), the spatio-temporal segments (time series data) are associated with the spatio-temporal IDs. The spatio-temporal IDs are identifiers for uniquely identifying the spatio-temporal segments. The spatio-temporal ID is expressed with a one-dimensional integer value, and the spatio-temporal segments are associated with the spatio-temporal IDs, with the result that the spatio-temporal segments may be expressed with unique integer values. Further, indices (spatio-temporal index data) 113 of the spatio-temporal segments associated with the spatio-temporal IDs are generated.

As illustrated in FIG. 2(*d*), the spatio-temporal data of one spatio-temporal segment includes the spatio-temporal ID, the time series data (time, attribute value), and the minimum value and the maximum value of the attribute values. When the time series data is expressed in binary, the capacity necessary for the time series data may be reduced. In addition, when the time and the attribute values of the grid time series data are expressed with relative values, the time series data may be expressed with a small number of bytes. Further, when the same attribute values appear in succession in the time series data, the data size may be reduced by equivalence compression for thinning out data therebetween. Thereafter, pieces of data that are highly related in time and space are arranged physically close. For example, the pieces of data are arranged in order from the oldest period of time, and for the same period of time, the pieces of data are arranged in order of going through the space in a Z order. It should be noted that the Z order is an approach of a space-filling curve that goes through a spatial plane in order from the closest spatial distance, and another space-filling curve such as a Hilbert curve may also be used. As a result, as illustrated in FIG. 2(*e*), a spatio-temporal ID is given to each spatio-temporal segment on an xy plane in a period of time t1.

When the space is three-dimensional, the arrangement method needs to be selected depending on the representation method of the space. For example, when an indoor space such as a building is the subject, a case is possible where the data is managed in 2.5 dimensions in which each floor constitutes a two-dimensional space. In this case, an effective method is to arrange the pieces of data in order from the oldest period of time, for the same period of time, arrange the pieces of data in order of height levels, and for the same level of height, arrange the pieces of data in order of going through the corresponding spatial plane in the Z order. On the other hand, when movement of substances in the atmosphere is the subject, it is required to treat the space in three dimensions. In this case, an effective method is to arrange the pieces of data in order from the oldest period of time and arrange the pieces of data in order of going through the three-dimensional space in the Z order.

FIG. 3 is a flow chart of processing of registering the spatio-temporal data according to the first embodiment of this invention.

First, the spatio-temporal data registration module 123 refers to a spatio-temporal schema to create the spatio-temporal data (spatio-temporal table) 112 (S101). It should be noted that the spatio-temporal table generated in Step S101 does not have any data registered yet.

Moreover, the spatio-temporal management data creation module 122 uses the input spatio-temporal management data to create the spatio-temporal management data (spatio-temporal management table) 111 (S102). The spatio-temporal management data used in creating the spatio-temporal management data is input as a file in a predetermined format (for example, CSV format).

Further, the spatio-temporal data registration module 123 reads the input spatio-temporal data as data before registration (S103). Thereafter, the spatio-temporal data registration module 123 uses the data before registration to generate data for registration (S104). To be specific, the spatio-temporal data registration module 123 calculates spatio-temporal IDs of the data to be registered, compresses the data, interpolates necessary data (at the boundary of the spatio-temporal segments, for example), and rearranges the pieces of data in accordance with the calculated spatio-temporal IDs. The processing of generating the data for registration is described in detail with reference to FIG. 4.

Thereafter, the spatio-temporal data registration module 123 registers the generated data for registration to the spatio-temporal data 112. Moreover, the spatio-temporal index data creation module 125 creates the spatio-temporal index data 113 based on the generated data for registration.

Figure 4:
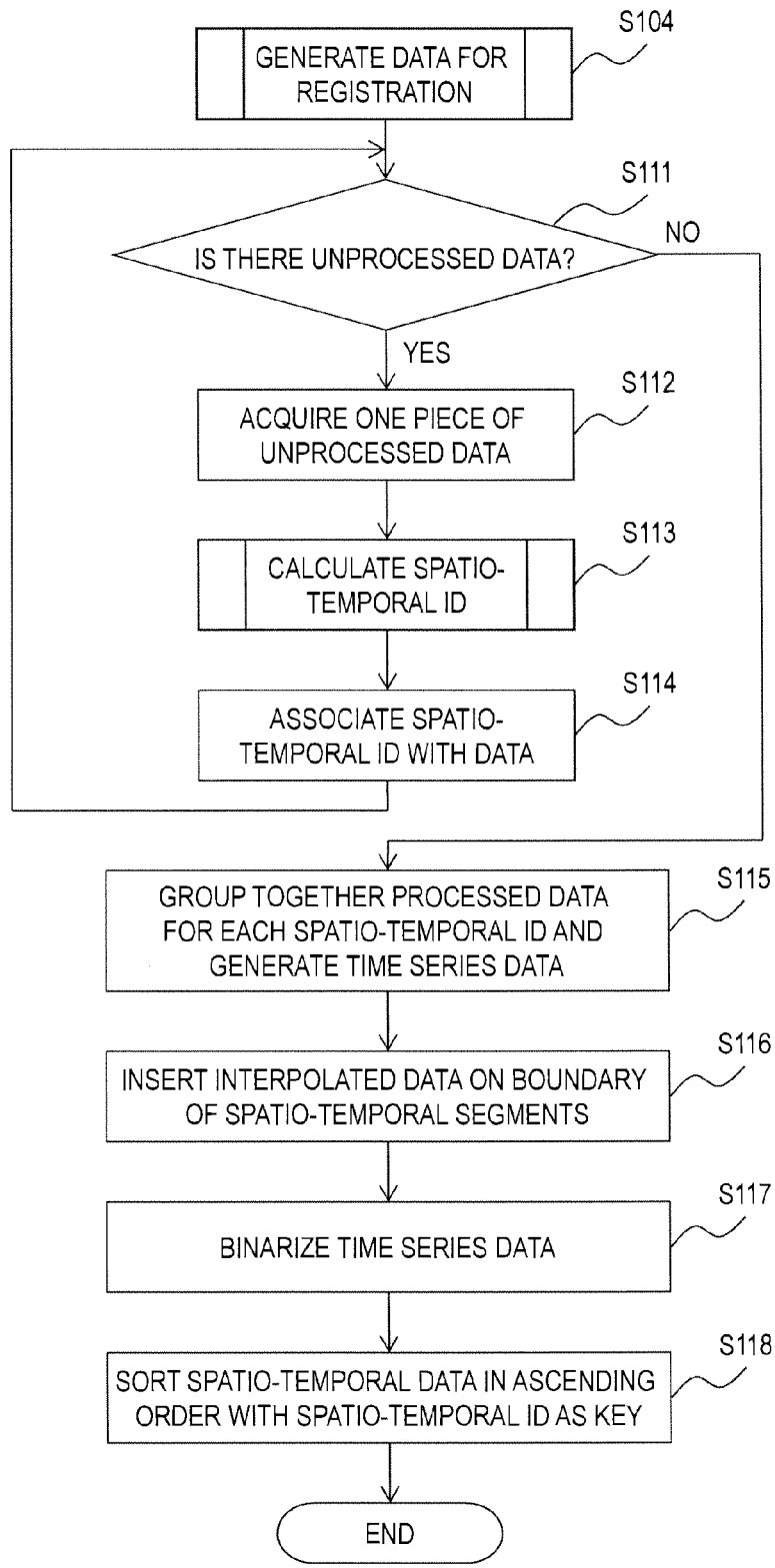
FIG. 4 is a flow chart of processing of generating data for registration according to the first embodiment of this invention.

FIG. 4 is a flow chart of the processing of generating the data for registration (S104) according to the first embodiment of this invention, and illustrates the processing of Step S104 of FIG. 3.

The spatio-temporal data in this embodiment is the grid time series data which is spatially segmented by grids and in which each spatio-temporal segment includes the time series data.

First, the spatio-temporal data registration module 123 determines whether the read data before registration includes unprocessed data (S111).

When no unprocessed data is included as a result of the determination, all pieces of data are already processed, and the processing proceeds to Step S115. On the other hand, when unprocessed data is included, one piece of the unprocessed data is acquired (S112), the spatio-temporal ID is calculated (S113), and the calculated spatio-temporal ID is associated with the data (S114). The processing of calculating the spatio-temporal ID is described in detail with reference to FIG. 5. In this manner, the spatio-temporal ID of each piece of the spatio-temporal data is calculated, and each spatio-temporal segment (spatio-temporal data) is associated with the spatio-temporal ID, with the result that each spatio-temporal segment may be expressed with a unique integer value.

In Step S115, the processed data is grouped together for each spatio-temporal ID and the time series data is generated. Then, as needed, interpolated data is inserted on the boundary of the spatio-temporal segments corresponding to the spatio-temporal IDs of the time series data (S116). Moreover, when the same attribute values appear in succession in the time series data, it is preferred to reduce the data size by the equivalence compression for thinning out the data therebetween.

Thereafter, the time series data is binarized (S117), and the time series data is sorted in ascending order of the spatio-temporal IDs (S118). At this time, the pieces of data are sorted so that pieces of data that are highly related in time and space are arranged physically close. In this case, the pieces of data are arranged in order from the oldest period of time, and for the same period of time, the pieces of data are arranged in order of going through the space in the Z order. In other words, (1) spatio-temporal IDs of small values are assigned to the spatio-temporal segments of old periods of time, and (2) for the same period of time, spatio-temporal IDs of close values are assigned to the spatio-temporal segments that are close in spatial distance so that the pieces of data are registered in order of the spatio-temporal IDs.

As characteristics of the Z order, when a two-dimensional square region parallel to the axes in space is specified, a Z value on the lower left (with minimum x and y coordinates) of the region is always larger than a Z value on the upper right (with maximum x and y coordinates). Therefore, the spatial region may be converted to a range of one-dimensional integer values easily. Moreover, the Z values may be calculated by conversion between binary and decimal numbers and rearrangement of the bits, and hence the Z values may be calculated easily.

Figure 5:
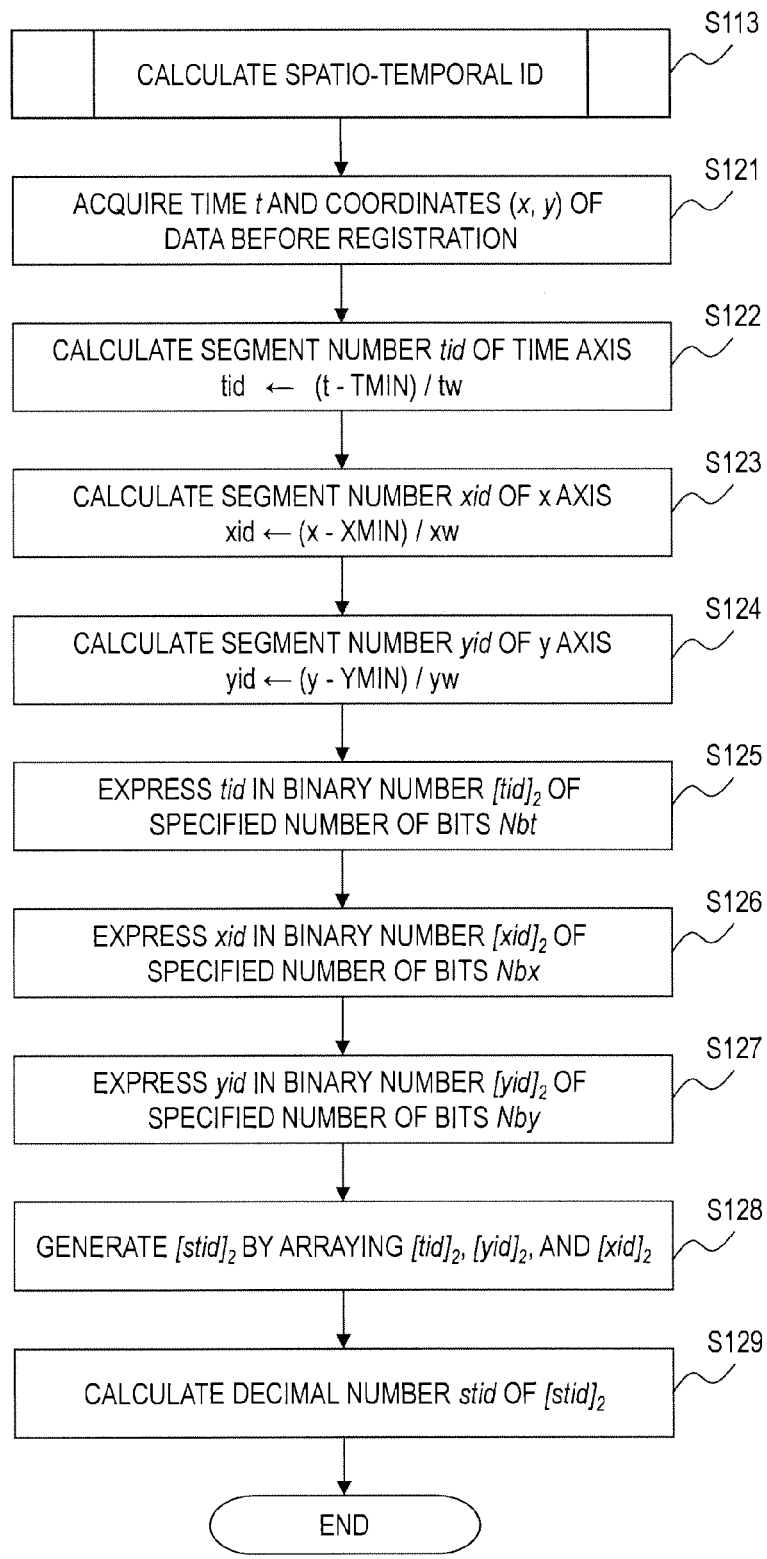
FIG. 5 is a flow chart of processing of calculating a spatio-temporal ID according to the first embodiment of this invention.

FIG. 5 is a flow chart of the processing of calculating the spatio-temporal ID (S113) according to the first embodiment of this invention, and illustrates the processing of Step S113 of FIG. 4.

First, the spatio-temporal data registration module 123 acquires a time t and coordinates (x, y) included in the data before registration (S121). Thereafter, a segment number tid of the time axis of the data before registration is calculated (S122). The segment number tid indicates the order of the spatio-temporal segment including the data before registration from the origin (start time) in the time axis direction.

Further, a segment number xid of an x axis of the data before registration is calculated (S123). The segment number xid indicates the order of the spatio-temporal segment including the data before registration from the origin (minimum value on the x axis) in the x-axis direction. Further, a segment number yid of a y axis of the data before registration is calculated (S124). The segment number yid indicates the order of the spatio-temporal segment including the data before registration from the origin (minimum value on the y axis) in the y-axis direction.

In Steps S121 to S123, TMIN is the start time on the time axis, and tw is a segment width on the time axis. Moreover, XMIN is the minimum value on the x axis, and xw is a segment width on the x axis. Moreover, YMIN is the minimum value on the y axis, and yw is a segment width on the y axis.

Next, tid is expressed in a binary number $[tid]_2$ of a specified number of bits Nbt (S125), xid is expressed in a binary number $[xid]_2$ of a specified number of bits Nbx (S126), and yid is expressed in a binary number $[yid]_2$ of a specified number of bits Nby (S127). It should be noted that $[\ ]_n$ represents an integer value in a base-n notation.

Thereafter, the spatio-temporal ID of Nb bits is divided to upper Nbt bits and lower (Nb-Nbt) bits, and $[stid]_2$ is generated by arraying $[tid]_2$ in upper bits and arraying $[yid]_2$ and $[xid]_2$ in lower bits in the stated order from the upper bits (S128).

Finally, $[stid]_2$ is converted to a decimal number to calculate stid (S129).

FIGS. 6A to 6D are diagrams illustrating an example of the spatio-temporal data (grid time series data) before registration according to the first embodiment of this invention.

FIGS. 6A to 6D exemplify the grid time series data in the two-dimensional space. A space range ranges from the lower left coordinates (0, 0) to the upper right coordinates (100, 100). Moreover, the start time of the grid time series data is t=0, and the cases of t=150 and t=300 are exemplified with the time interval of 150. Moreover, for simplicity of description, the time and the coordinate values are expressed with simple integer values. In practice, for example, the time is expressed by year, month, date, hour, minute, and second or UNIX time (UNIX is a trademark, the same applies below), and the coordinate values are expressed in latitude/longitude coordinates or a plane rectangular coordinate system.

Figures 6A, 6B:
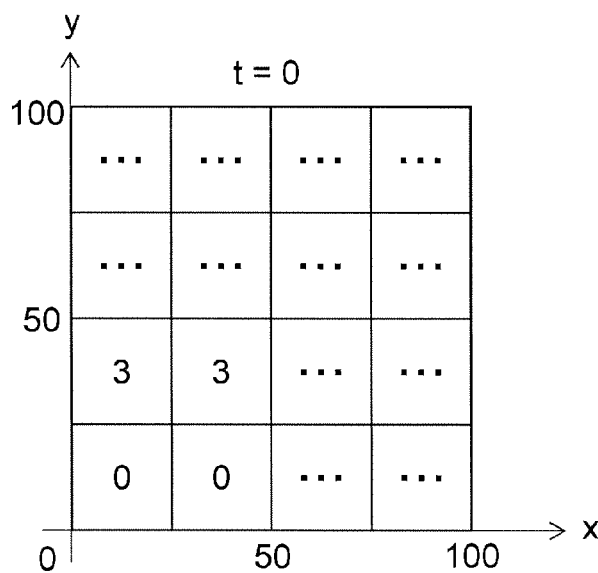
FIGS. 6A to 6D are diagrams illustrating an example of the spatio-temporal data (grid time series data) before registration to the spatio-temporal data management system according to the first embodiment of this invention.

As illustrated in FIG. 6A, the spatio-temporal data (grid time series data) includes the fields of time, space (coordinate values), and attribute value. The "space" column in the table illustrated in FIG. 6A indicates a space range of the spatio-temporal segment, and the lower left coordinates and the upper right coordinates of the space range are written.

Figure 6C:
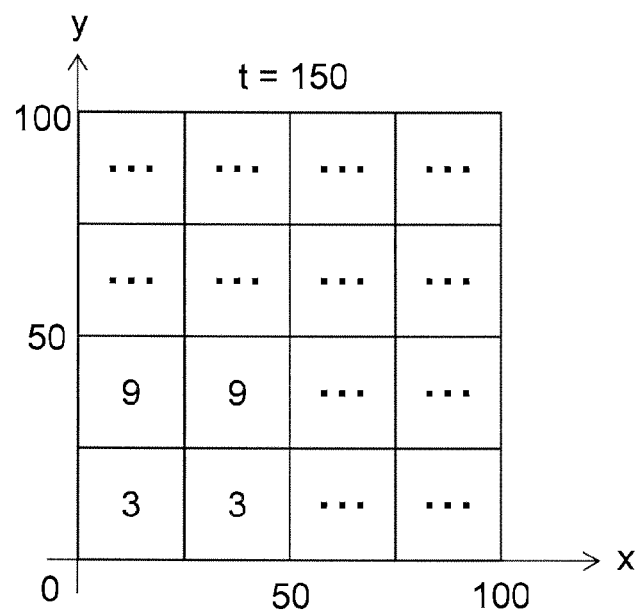
Figure 6D:
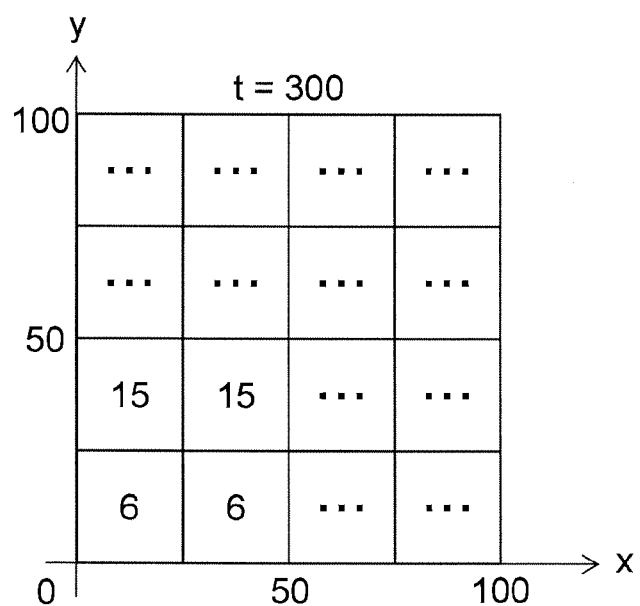

FIGS. 6B, 6C, and 6D illustrate the attribute values of the spatio-temporal segments on the xy plane at the times t=0, t=150, and t=300, respectively. It should be noted that in the example illustrated in FIGS. 6A to 6D, one attribute value is included in one spatio-temporal segment.

In the illustrated example, the grid time series data consists of 25 squares per side to which the attribute values are associated, and the attribute values for four spatio-temporal segments on the lower left are specifically illustrated, and illustration of the attribute values for the other spatio-temporal segments is omitted.

FIG. 7 is a diagram illustrating an example of the spatio-temporal management data 111 according to the first embodiment of this invention.

The spatio-temporal management data 111 of the grid time series data includes the fields of data name, management parameter, and value.

The data names represent data types that are the subject of the management parameters registered in the spatio-temporal management data 111 and include, for example, the "grid time series data" and the "point time series data" (see FIG. 19).

Of the management parameters, the "number of bits of the spatio-temporal ID" defines the number of bits of the integer value in which the spatio-temporal ID is expressed. Moreover, the "space dimension" is "2" for the two-dimensional xy plane, and is "3" for a three-dimensional xyz space.

Based on the spatio-temporal management data 111, the number of spatial bits (minimum number of bits required to express the number of segments of each axis of the space) and the number of temporal bits of the spatio-temporal ID may be determined.

In the example of the spatio-temporal management data 111 illustrated in FIG. 7, four segments in the x-axis direction require 2 bits in the x axis, and four segments in the y-axis direction require 2 bits in the y axis, with the result that the number of spatial bits totals 4 bits. The number of temporal bits is a value obtained by subtracting the number of spatial bits from the number of bits of the spatio-temporal ID, and is 4 bits in the example of the spatio-temporal management data 111 illustrated in FIG. 7.

Figure 8A:
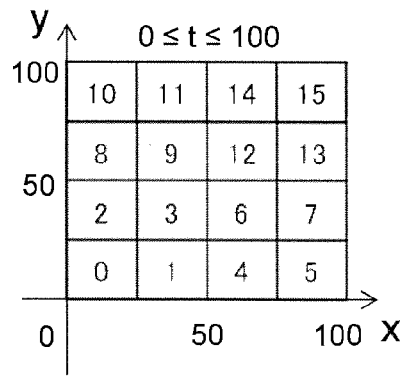
FIGS. 8A to 8C are diagrams illustrating an example of the spatio-temporal ID given to a spatio-temporal segment according to the first embodiment of this invention.
Figure 8B:
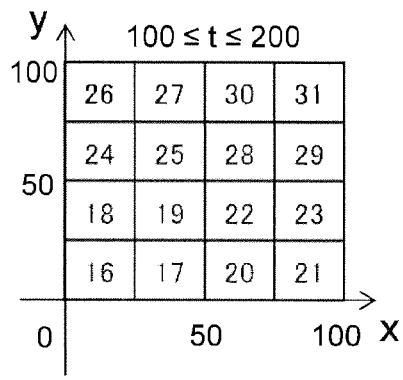
Figure 8C:
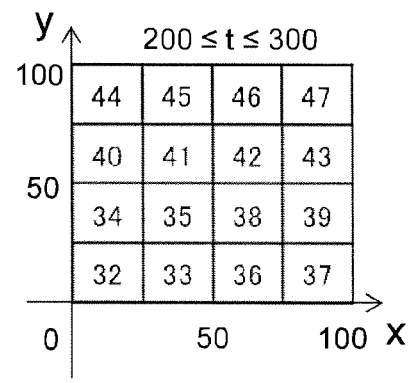

FIGS. 8A to 8C are diagrams illustrating an example of the spatio-temporal IDs given to the spatio-temporal segments according to the first embodiment of this invention, and illustrate the spatio-temporal IDs of the spatio-temporal segments to which the spatio-temporal management data 111 illustrated in FIG. 7 is applied.

As illustrated in FIG. 8A, the spatio-temporal segments at the times t=0 to 100 are given the spatio-temporal IDs of 0 to 15. The spatio-temporal IDs are given by using the Z order as described above. In the same manner, the spatio-temporal segments at the times t=100 to 200 are given the spatio-temporal IDs of 16 to 31 (see FIG. 8B), and the spatio-temporal segments at the times t=200 to 300 are given the spatio-temporal IDs of 32 to 47 (see FIG. 8C).

FIG. 9 is a diagram illustrating a configuration example of the spatio-temporal data 112 to which the grid time series data is registered according to the first embodiment of this invention.

The spatio-temporal data 112 illustrated in FIG. 9 is generated by application of the definitions of the spatio-temporal management data 111 illustrated in FIG. 7 to the spatio-temporal data (grid time series data) illustrated in FIG. 6A.

As illustrated in FIG. 9, the spatio-temporal data 112 includes the fields of spatio-temporal ID and time series data (time, attribute value) and is constituted of the spatio-temporal table in the form of a table, for example.

The spatio-temporal table may include the minimum value and the maximum value of the attribute values as needed. The "attribute value MIN" is the minimum value of the attribute values of the time series data of the record, and the "attribute value MAX" is the maximum value of the attribute values of the time series data of the record. The "attribute value MIN" and "attribute value MAX" are used in a spatio-temporal search including a condition of the attribute values.

In this embodiment, for use in the spatio-temporal search, data is registered on the boundary of the spatio-temporal segments. In this example in which the time unit segment width is 100, the attribute values at the times t=100 and t=200 are interpolated from real data and registered. Linear interpolation may be used for the interpolation.

FIG. 10 is a diagram illustrating a physical arrangement of the grid time series data according to the first embodiment of this invention.

In FIG. 10, the numerical values in the squares indicate the spatio-temporal IDs, and each square is a record of the spatio-temporal data including the time series data, the attribute value MIN, and the attribute value MAX. Pieces of the spatio-temporal data are arranged on the secondary storage device in order of the spatio-temporal IDs.

As described above, for the same period of time, the pieces of data are arranged on the disk in order from the closest spatial distance (in order of the spatio-temporal IDs), and further, the pieces of data are arranged in order of the periods of time.

In the spatio-temporal data management system in this embodiment, a field with certain widths of time and space is often used as a condition for a search, and hence pieces of data that are close in spatial distance are often accessed at the same time. Therefore, the pieces of data that are close in spatial distance may be arranged close on the disk, to thereby decrease the I/O processing in the search so that the search may be performed at high speed.

(Processing of Searching Grid Time Series Data)

Next, processing of searching the grid time series data is described.

FIG. 11 is a diagram illustrating an outline of search of the grid time series data according to the first embodiment of this invention.

The grid time series data in the first embodiment is searched in two steps: (1) the rough determination; and (2) the detailed determination.

In the rough determination, the spatio-temporal IDs are used to extract the spatio-temporal segments satisfying the search conditions. Moreover, when a condition of the attribute value is specified, the spatio-temporal segments satisfying the search conditions are narrowed down with the attribute value MIN and the attribute value MAX. Thereafter, in the detailed determination, the time series data of the spatio-temporal segments extracted in the rough determination is referred to, and the time series data consistent with the search conditions is extracted. It should be noted that in the detailed determination, the time series data is interpolated to determine whether the time series data is consistent with the search conditions (temporal condition, spatial condition, and attribute condition).

Figure 12:
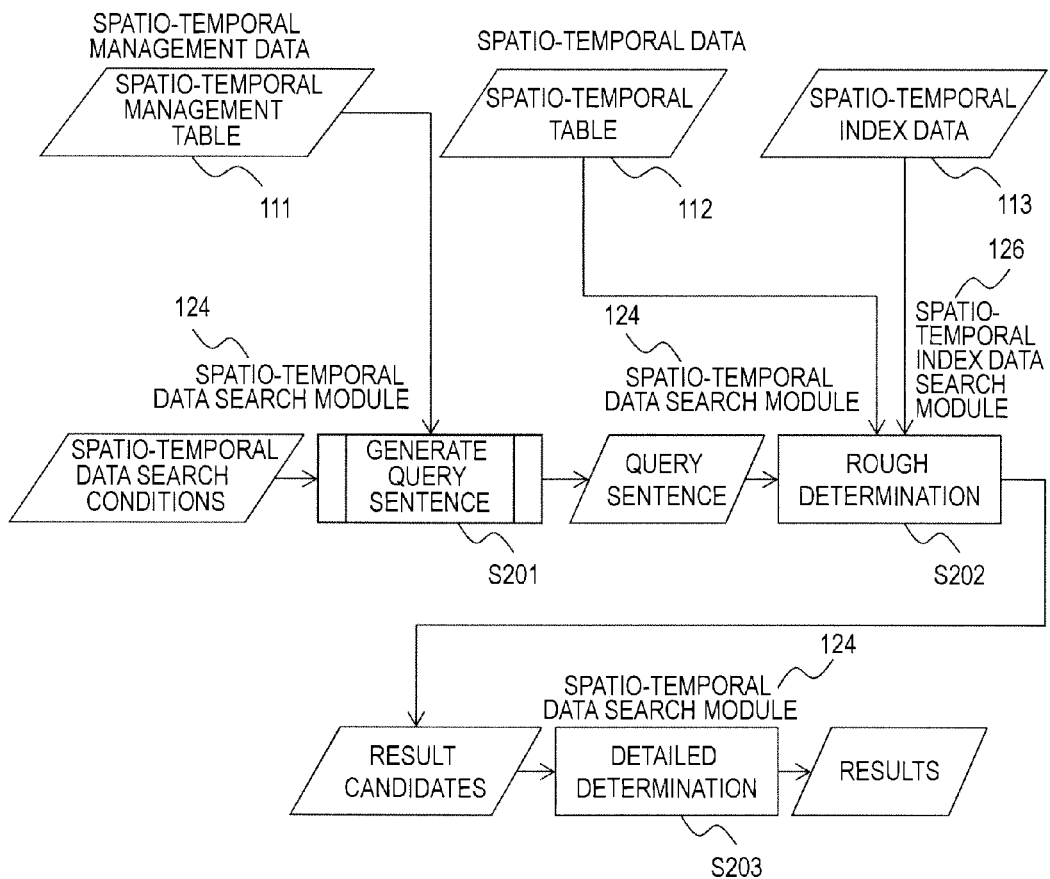
FIG. 12 is a flow chart of processing of searching the spatio-temporal data according to the first embodiment of this invention.

FIG. 12 is a flow chart of processing of searching the spatio-temporal data according to the first embodiment of this invention.

First, when spatio-temporal data search conditions are input, the spatio-temporal data search module 124 creates a query sentence for the search (S201). In the processing of creating the query sentence, the spatio-temporal management table 111 is referred to and the spatio-temporal IDs of the spatio-temporal segments consistent with the search conditions are identified, to thereby create the query sentence including the identified spatio-temporal IDs. The processing of creating the query sentence is described in detail with reference to FIG. 13.

The spatio-temporal data search conditions include the temporal condition (time or period) and the spatial condition (polygon). The space range is generally specified as the polygon, but for simplicity, the case of rectangles is described below. It should be noted that when the spatial condition is a polygon other than the rectangle, for example, a search may be performed with a circumscribed rectangle that contains the polygon, and it may be determined whether or not the search result is included in the polygon, to thereby determine the search result. This method is also applicable for a case where the point time series data is the subject as described below. The spatio-temporal data search conditions may include a condition of the attribute values. The condition of the attribute values includes a combination of numerical value data (determination threshold value) and a condition (such as equality or inequality).

Next, the spatio-temporal index data search module 126 executes the rough determination (S202). To be specific, the spatio-temporal index data search module 126 refers to the spatio-temporal index data 113 to identify data of the spatio-temporal IDs consistent with the condition of the spatio-temporal IDs included in the query sentence. Thereafter, the spatio-temporal data search module 124 acquires the data of the spatio-temporal IDs, which is identified by the spatio-temporal index data search module 126, from the spatio-temporal data 112. It should be noted that when the spatio-temporal data search conditions include the condition of the attribute values, the spatio-temporal index data search module 126 refers to the attribute value MIN and the attribute value MAX of the spatio-temporal data to determine whether the spatio-temporal data satisfies the condition of the attribute values. Then, in the rough determination (S202), result candidates are determined.

Next, the spatio-temporal data search module 124 uses the result of the rough determination to execute the detailed determination (S203). To be specific, the spatio-temporal data search module 124 refers to data of spatio-temporal segments of the result candidates to determine whether time series data of each spatio-temporal segment satisfies the temporal condition, the spatial condition, and the attribute condition. It should be noted that when there is no time series data corresponding to the search conditions, interpolation is performed with the time series data in the spatio-temporal segments to generate the attribute values corresponding to the search conditions (time and space). Then, results consistent with the search conditions are extracted by the detailed determination (S203).

Figure 13:
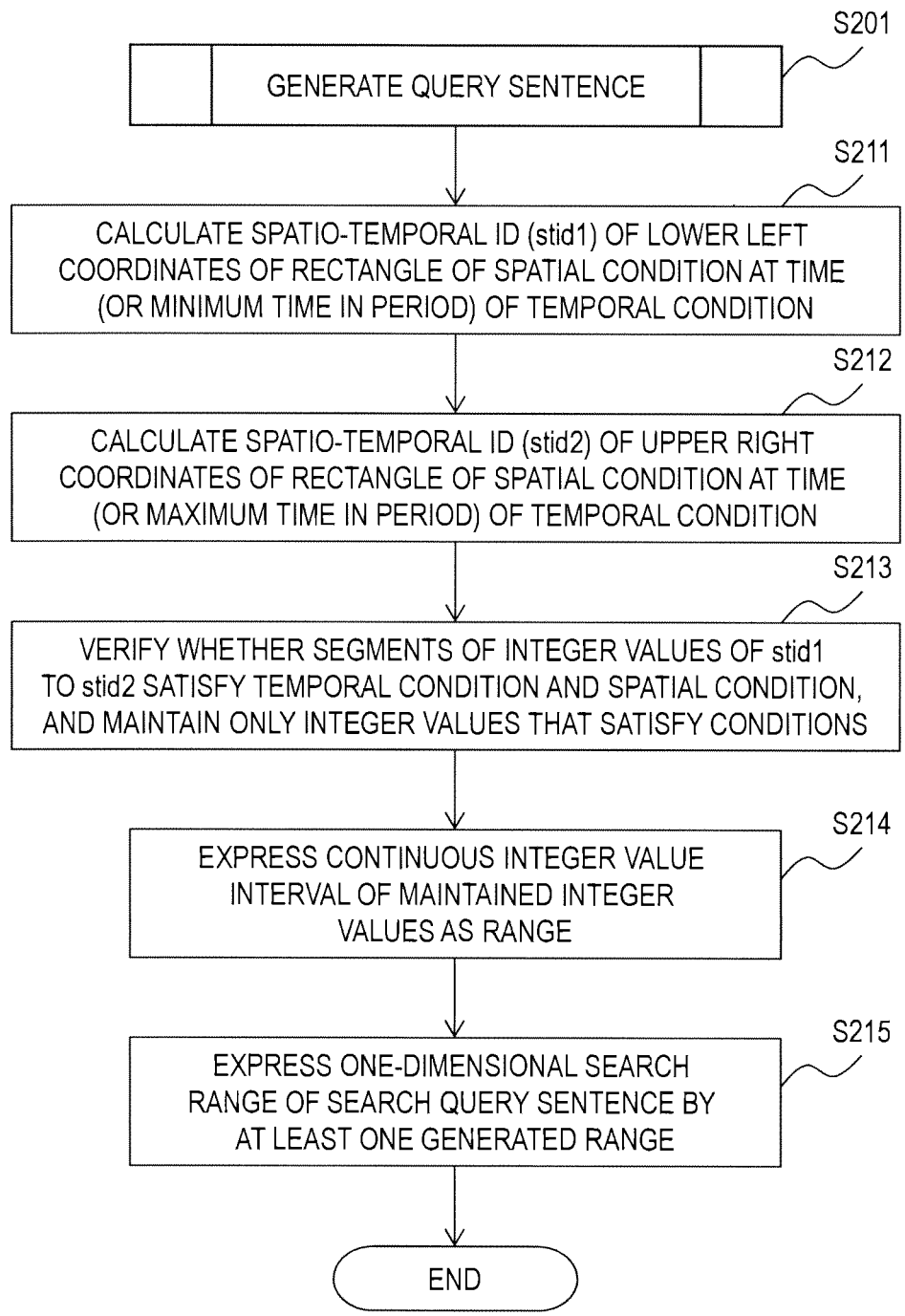
FIG. 13 is a flow chart of processing of creating a query sentence according to the first embodiment of this invention.

FIG. 13 is a flow chart of the processing of creating the query sentence according to the first embodiment of this invention.

First, at the time of the temporal condition, the spatio-temporal data search module 124 calculates the spatio-temporal ID (stid1) of the lower left coordinates of the rectangle of the spatial condition (S211), and calculates the spatio-temporal ID (stid2) of the upper right coordinates of the rectangle of the spatial condition (S212). For the calculation of the spatio-temporal IDs in Steps S211 and S212, the processing of calculating the spatio-temporal ID described above (FIG. 5) may be used. It should be noted that when a period is specified as the temporal condition, the spatio-temporal ID (stid1) at the minimum time in the specified period is calculated in Step S211, and the spatio-temporal ID (stid2) at the maximum time in the specified period is calculated in Step S212.

Next, the spatio-temporal data search module 124 determines whether the spatio-temporal segments having the spatio-temporal IDs of stid1 or more and stid2 or less satisfy the temporal condition and the spatial condition, and excludes integer values that do not satisfy the temporal condition and the spatial condition to maintain only integer values that satisfy the conditions (S213).

Further, the spatio-temporal data search module 124 expresses an continuous interval of the maintained integer values as a range (S214), and expresses a one-dimensional search range of the query sentence by the generated at least one range (S215).

FIG. 14 is a diagram illustrating an example of a search for a spatio-temporal range of the grid time series data when a "time point" is specified as the temporal condition.

In the example illustrated in FIG. 14, the search conditions include the temporal condition of t=50 and the spatial condition of (x, y)=(0, 0) to (50, 50). The search result is constituted of a set of a grid space range and the time series data.

First, in the rough determination, the search conditions are converted to a search range of the spatio-temporal IDs. This conversion may be calculated by using the time and the space range of the search conditions and referring to the spatio-temporal management data (FIG. 7) (the method described with reference to FIG. 5 is used). In the example illustrated in FIG. 14, the rough determination provides the spatio-temporal segments illustrated in the broken lines as the result candidates, and records that satisfy 0≤(spatio-temporal ID)≤3 are acquired as the result candidates from the spatio-temporal data 112.

Next, in the detailed determination, the time series data of each of the spatio-temporal segments is referred to, and it is determined whether the result candidates extracted in the rough determination satisfy the search conditions. In the example illustrated in FIG. 14, all the records extracted in the rough determination satisfy the conditions, and hence all the result candidates are maintained as final results.

In the example illustrated in FIG. 14, the attribute value at the time t=50 is determined. However, the data at the time t=50 is not included in the time series data and hence is interpolated. Specifically, the linear interpolation is performed based on the attribute values before and after the time t=50. For example, in the case of the record with the spatio-temporal ID of 0, the linear interpolation is performed by using the time series data of (0, 0) and the time series data of (100, 2) to calculate time series data (50, 1).

The grid space range of the search result is the lower left coordinates and the upper right coordinates of the space range of the grids, and the time series data is in the form of a list having the time and the attribute value as elements. In the example illustrated in FIG. 14, the temporal condition is the time, and hence the time series data of each of the spatio-temporal segments includes only one element.

FIG. 15 is a diagram illustrating an example of a search for a spatio-temporal range of the grid time series data when a "time period" is specified as the temporal condition.

In the example illustrated in FIG. 15, the search conditions include the temporal condition of t=50 to 150 and the spatial condition of (x, y)=(0, 0) to (50, 50). The search result is constituted of a set of the grid space range and the time series data.

First, in the rough determination, the search conditions are converted to a search range of the spatio-temporal IDs. This conversion may be calculated by using the time period (start time and end time) and the space range of the search conditions and referring to the spatio-temporal management data (FIG. 7) (the method described with reference to FIG. 5 is used). In the example illustrated in FIG. 15, the rough determination provides the spatio-temporal segments that satisfy 0≤(spatio-temporal ID)≤3 or 16≤(spatio-temporal ID)≤19 as the result candidates, and records of the result candidates are acquired from the spatio-temporal data 112.

Next, in the detailed determination, the time series data of each of the spatio-temporal segments is referred to, and it is determined whether the result candidates extracted in the rough determination satisfy the search conditions. In the example illustrated in FIG. 15, all the records extracted in the rough determination satisfy the conditions, and hence all the result candidates are maintained as final results.

In the example illustrated in FIG. 15, the attribute values at the times t=50 and t=150 are determined. However, the data at the time t=50 is not included in the "time series data" and hence is interpolated. Specifically, the linear interpolation is performed based on the attribute values before and after the time t=50. For example, in the case of the record with the spatio-temporal ID of 0, the linear interpolation is performed by using the time series data of (0, 0) and the time series data of (100, 2) to calculate the time series data (50, 1).

The grid space range of the search result is the lower left coordinates and the upper right coordinates of the space range of the grids, and the time series data is in the form of a list having the time and the attribute values as elements. In the example illustrated in FIG. 15, the temporal condition is the time period, and hence the time series data of each of the spatio-temporal segments includes the attribute values corresponding to the start time and the end time and the time series data (attribute values at the time t=100 between the start time and the end time) of the records acquired in the rough determination.

FIG. 16 is a diagram illustrating an example of a search for a spatio-temporal range of the grid time series data when the attribute condition is specified.

In the example illustrated in FIG. 16, the search conditions include the temporal condition of t=50, the spatial condition of (x, y)=(0, 0) to (50, 50), and the attribute condition of (attribute value)≤1. The search result is constituted of a set of the grid space range and the time series data.

First, in the rough determination, the search conditions are converted to a search range of the spatio-temporal IDs. This conversion may be calculated by using the time and the space range of the search conditions and referring to the spatio-temporal management data 111 (FIG. 7) (the method described with reference to FIG. 5 is used). In the example illustrated in FIG. 16, the rough determination provides the spatio-temporal segments that satisfy 0≤(spatio-temporal ID)≤3 and (attribute value MAX)≤1 as the result candidates, and records of the result candidates are acquired from the spatio-temporal data 112. It should be noted that the records with the attribute value MAX of 1 or lower is selected in the rough determination because when the maximum value of the attribute values is 1 or lower, it is probable that the attribute values of the spatio-temporal data included in the spatio-temporal segments are 1 or lower.

Next, in the detailed determination, the time series data of each of the spatio-temporal segments is referred to, and it is determined whether the result candidates extracted in the rough determination satisfy the search conditions. In the example illustrated in FIG. 16, all the records extracted in the rough determination satisfy the conditions, and hence all the result candidates are maintained as final results.

In the example illustrated in FIG. 16, the attribute value at the time t=50 is determined. However, the data at the time t=50 is not included in the "time series data" and hence is interpolated. Specifically, the linear interpolation is performed based on the attribute values before and after the time t=50. For example, in the case of the record with the spatio-temporal ID of 0, the linear interpolation is performed by using the time series data of (0, 0) and the time series data of (100, 2) to calculate the time series data (50, 1).

The grid space range of the search result is the lower left coordinates and the upper right coordinates of the space range of the grids, and the time series data is in the form of a list having the time and the attribute values as elements. In the example illustrated in FIG. 16, the temporal condition is the time, and hence the time series data of each of the spatio-temporal segments includes only one element.

Second Embodiment

Next, a second embodiment of this invention is described. In the second embodiment of this invention, a spatio-temporal data management system capable of processing point time series data is described.

Figures 17A, 17B:
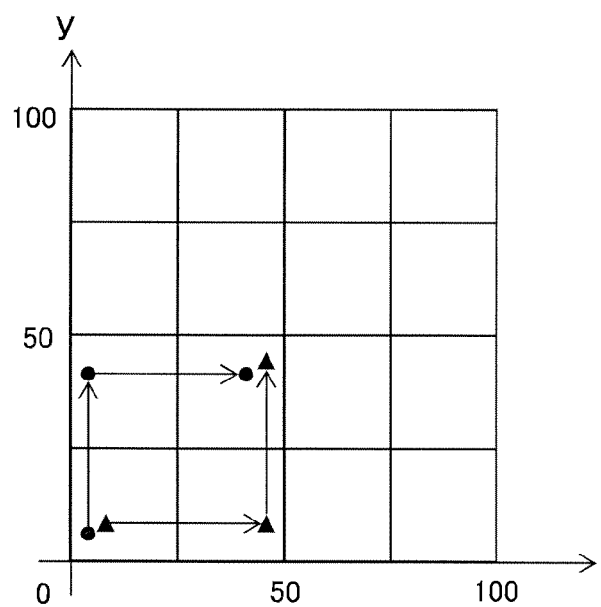
FIGS. 17A and 17B are diagrams illustrating an example of the spatio-temporal data (point time series data) before registration to the spatio-temporal data management system according to a second embodiment of this invention.

FIGS. 17A and 17B are diagrams illustrating an example of the spatio-temporal data (point time series data) before registration to the spatio-temporal data management system according to the second embodiment of this invention.

FIGS. 17A and 17B exemplify the grid time series data of the two-dimensional space. The space range ranges from the lower left coordinates (0, 0) to the upper right coordinates (100, 100). Moreover, the start time of the grid time series data is t=0, and the cases of t=150 and t=300 are exemplified with the time period interval of 150. Moreover, for simplicity of description, the time and the coordinate values are expressed with simple integer values. In practice, for example, the time is expressed by year, month, date, hour, minute, and second or the UNIX time, and the coordinate values are expressed in the longitude/latitude coordinates or the plane rectangular coordinate system.

As illustrated in FIG. 17A, the spatio-temporal data (point time series data) includes the fields of time, space (coordinate values), and object ID. In the "space" column in the table illustrated in FIG. 17A, coordinate values of a position at which an object has been located are written. The object ID is an identifier for uniquely identifying the object.

FIG. 17B illustrates positions (coordinates) of moving objects having object IDs of 1 and 2 at the times t=0, t=150, and t=300 on the xy plane (spatio-temporal segments).

Figure 18:
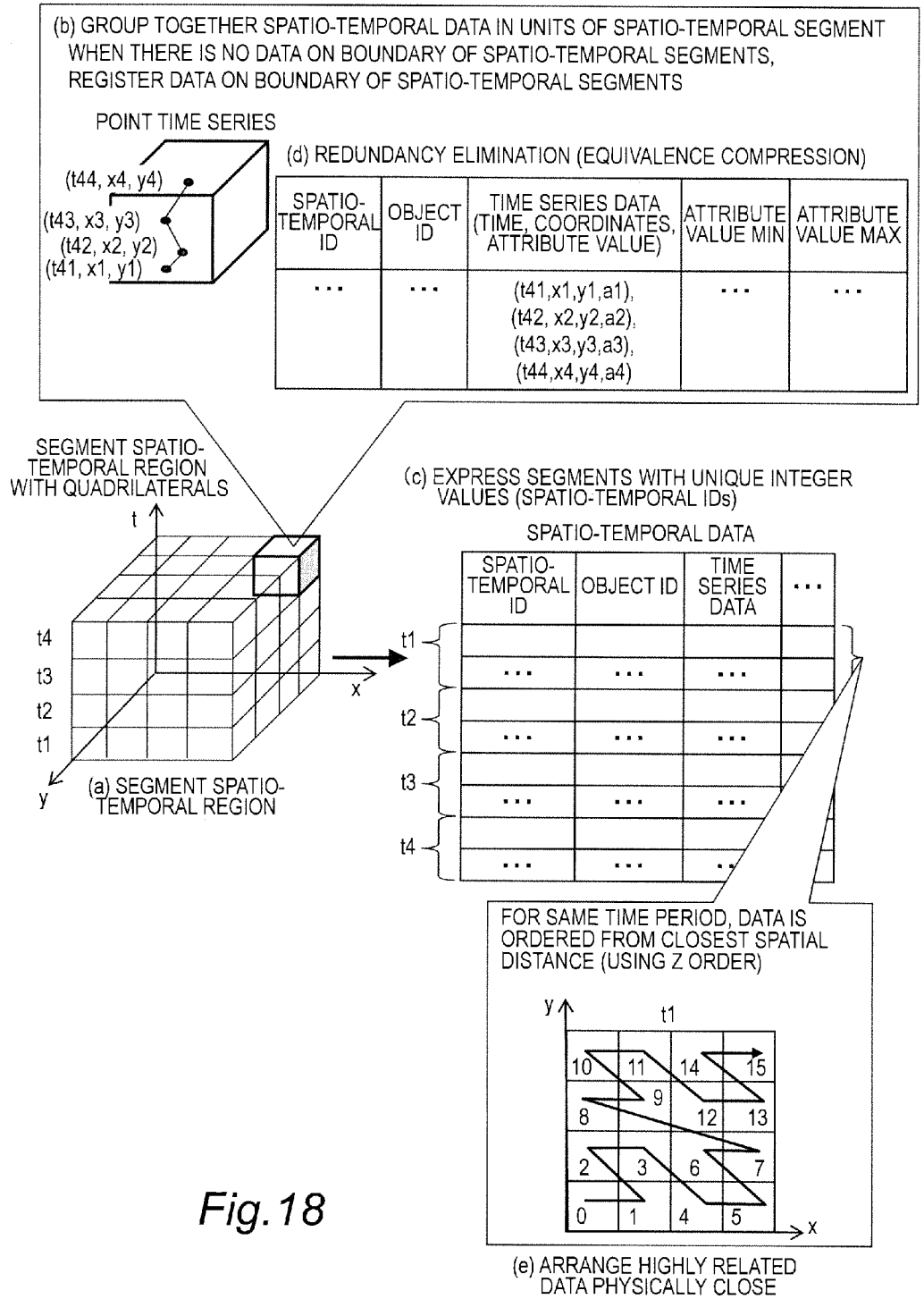
FIG. 18 is a diagram illustrating an outline of processing of registering the spatio-temporal data according to the second embodiment of this invention.

FIG. 18 is a diagram illustrating an outline of processing of registering the spatio-temporal data according to the second embodiment of this invention.

The spatio-temporal data in this embodiment is the point time series data which is spatially segmented by grids and in which each segment includes the time series data (time, coordinates, attribute value).

First, as illustrate din FIG. 18(a), before registering the spatio-temporal data, time and space are segmented in accordance with the spatio-temporal management data 111 input by a user, to thereby define the spatio-temporal segments. Each spatio-temporal segment is correlated with the time series data. It should be noted that as illustrated in FIG. 18(b), the point time series data may include a plurality of pieces of time series data in one spatio-temporal segment. The plurality of pieces of time series data include, when there is no data at a position on a plurality of trajectories included in one spatio-temporal segment or on a boundary of the spatio-temporal segments, data registered on the boundary of the spatio-temporal segments by interpolation using adjacent data.

Thereafter, the spatio-temporal ID of each piece of the spatio-temporal data is calculated, and as illustrated in FIG. 18(c), the spatio-temporal segments (object ID and time series data) are associated with the spatio-temporal IDs. The spatio-temporal ID is expressed with a one-dimensional integer value, and the spatio-temporal segments are associated with the spatio-temporal IDs, with the result that the spatio-temporal segments may be expressed with unique integer values. Further, indices (spatio-temporal index data) 113 of the spatio-temporal segments associated with the spatio-temporal IDs are generated.

As illustrated in FIG. 18(d), the spatio-temporal data of one spatio-temporal segment includes the spatio-temporal ID, the object ID, the time series data (time, coordinate values, attribute value), and the minimum value and the maximum value of the attribute values. When the time, the coordinate values, and the attribute values of the time series data of the point time series data are expressed with relative values, the time series data may be expressed with a small number of bytes. Moreover, when the same coordinate values and attribute values appear in succession in the time series data, the data size may be reduced by the equivalence compression for thinning out data therebetween.

Thereafter, pieces of highly related data are sorted so as to be arranged physically close. For example, the pieces of data are arranged in order from the oldest time period, and for the same time period, the pieces of data are arranged in order of going through the space in the Z order. As a result, as illustrated in FIG. 18(e), a spatio-temporal ID is given to each spatio-temporal segment on the xy plane in a time period t1.

FIG. 19 is a diagram illustrating an example of the spatio-temporal management data 111 according to the second embodiment of this invention.

The spatio-temporal management data 111 of the point time series data includes the fields of data name, management parameter, and value. The spatio-temporal management data 111 in the second embodiment is different from the spatio-temporal management data 111 (FIG. 7) in the first embodiment described above in that the data name is "point time series data", and is similar to the spatio-temporal management data 111 in the first embodiment described above in other points. Therefore, detailed description thereof is omitted.

Figures 20, 21:
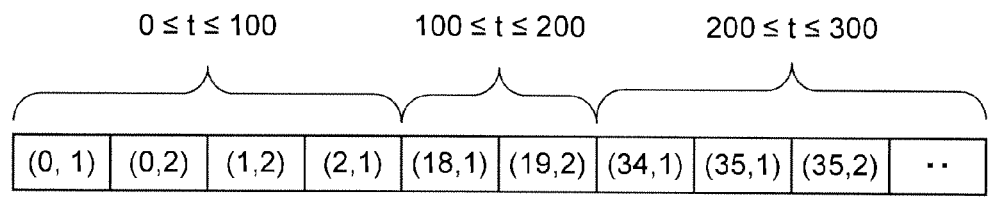
FIG. 20 is a diagram illustrating a configuration example of the spatio-temporal data to which point time series data is registered according to the second embodiment of this invention.
FIG. 21 is a diagram illustrating a physical arrangement of the point time series data according to the second embodiment of this invention.

FIG. 20 is a diagram illustrating a configuration example of the spatio-temporal data 112 to which the point time series data is registered according to the second embodiment of this invention.

The spatio-temporal data 112 illustrated in FIG. 20 is generated by application of the definitions of the spatio-temporal management data 111 illustrated in FIG. 19 to the spatio-temporal data (point time series data) illustrated in FIG. 17A.

As illustrated in FIG. 20, the spatio-temporal data (point time series data) 112 includes the fields of spatio-temporal ID, object ID, and time series data (time, coordinates) and is constituted of the spatio-temporal table in the form of a table, for example. It should be noted that the time series data may include the attribute values in addition to the time and the coordinates. In this case, the spatio-temporal table may include the minimum value and the maximum value (attribute value MIN and attribute value MAX) of the attribute values. The attribute value MIN and the attribute value MAX are as defined in the spatio-temporal data 112 (FIG. 9) in the first embodiment described above.

In this embodiment, for use in the spatio-temporal search, data is registered on the boundary of the spatio-temporal segments. In this example in which the time unit segment width is 100, the attribute values at the times t=100 and t=200 are interpolated from actual data and registered. For example, in a record having the spatio-temporal ID of 0 and the object ID of 1, the interpolation may be performed by using the time series data (0, 10, 10) and (150, 10, 40) to generate data (75, 10, 25) on the line y=25. In the same manner, in a record having the spatio-temporal ID of 2 and the object ID of 1, the interpolation may be performed by using the time series data (0, 10, 10) and (150, 10, 40) to generate data (100, 10, 30) on the line t=100.

FIG. 21 is a diagram illustrating a physical arrangement of the point time series data according to the second embodiment of this invention.

In FIG. 21, the numerical values in the squares indicate the spatio-temporal ID and the object ID in order from the left, and each square is a record of the spatio-temporal data including the time series data (the attribute value MIN and the attribute value MAX as needed). Pieces of the spatio-temporal data are arranged on the secondary storage device in order of the spatio-temporal IDs.

As described above, for the same time period, the pieces of data are arranged on the disk in order from the closest spatial distance (in order of the spatio-temporal IDs), and further, the pieces of data are arranged in order of the time periods.

In the spatio-temporal data management system in this embodiment, a field with certain widths of time and space is often used as a condition for a search, and hence pieces of data that are close in spatial distance are often accessed at the same time. Therefore, the pieces of data that are close in spatial distance may be arranged close on the disk, to thereby decrease the I/O processing in the search so that the search may be performed at high speed.

(Processing of Searching Point Time Series Data)

Next, processing of searching the point time series data in the second embodiment is described. The processing of searching time series data in the second embodiment is the same as the processing of searching the grid time series data in the first embodiment described above (FIGS. 12 and 13), and hence description of a flow chart is omitted.

FIG. 22 is a diagram illustrating an outline of search of the point time series data according to the second embodiment of this invention.

The point time series data in the second embodiment is searched in two steps: (1) the rough determination; and (2) the detailed determination.

Details of the rough determination and the detailed determination are the same as the details of the determinations in the first embodiment described above. It should be noted that also in the detailed determination in the second embodiment, as in the first embodiment described above, the time series data is interpolated to determine whether the time series data is consistent with the search conditions (temporal condition, spatial condition, and attribute condition).

FIG. 23 is a diagram illustrating an example of a search for a spatio-temporal range of the point time series data when a "time" is specified as the temporal condition.

In the example illustrated in FIG. 23, the search conditions include the temporal condition of t=50 and the spatial condition of (x, y)=(0, 0) to (50, 50). The search result is constituted of a set of the object ID and the time series data.

First, in the rough determination, the search conditions are converted to a search range of the spatio-temporal IDs. This conversion may be calculated by using the time and the space range of the search conditions and referring to the spatio-temporal management data 111 (FIG. 19) (the method described with reference to FIG. 5 is used). In the example illustrated in FIG. 23, the rough determination provides the spatio-temporal segments illustrated in the broken lines as the result candidates, and records that satisfy 0≤(spatio-temporal ID)≤3 are acquired as the result candidates from the spatio-temporal data 112.

Next, in the detailed determination, the time series data of each of the spatio-temporal segments is referred to, and it is determined whether the result candidates extracted in the rough determination satisfy the search conditions. In the example illustrated in FIG. 23, of the records extracted in the rough determination, a record having the spatio-temporal ID of 2 and the object ID of 1 is the spatio-temporal data at the times t=75 to 100, which does not satisfy the temporal condition, and hence the record is excluded from the results. It should be noted that in the example illustrated in FIG. 23, the coordinate values at the time 50 may be determined based on the record having the spatio-temporal ID of 0 and the object ID of 2 as well as the record having the spatio-temporal ID of 1 and the object ID of 2, but duplicates are eliminated from the final results.

In the example illustrated in FIG. 23, the attribute value at the time t=50 is determined. However, when the data at the time t=50 is not included in the "time series data", the data is interpolated. Specifically, the linear interpolation is performed based on the attribute values before and after the time t=50. For example, for the spatio-temporal data having the object ID of 1, the linear interpolation is performed by using the time series data of (0, 10, 10) and the time series data of (75, 10, 25) to calculate the time series data (50, 10, 20).

The time series data as the search result is in the form of a list having the time and the coordinates of the point as elements. In the example illustrated in FIG. 23, the temporal condition is the time, and hence the time series data of each of the object IDs includes only one element.

FIG. 24 is a diagram illustrating an example of a search for a spatio-temporal range of the point time series data when a "time period" is specified as the temporal condition.

In the example illustrated in FIG. 24, the search conditions include the temporal condition of t=50 to 150 and the spatial condition of the rectangle having (x, y)=(0, 0) to (50, 50). The search result is constituted of a set of the object ID and the time series data.

First, in the rough determination, the search conditions are converted to a search range of the spatio-temporal IDs. This conversion may be calculated by using the time period (start time and end time) and the space range of the search conditions and referring to the spatio-temporal management data (FIG. 19) (the method described with reference to FIG. 5 is used). In the example illustrated in FIG. 24, the rough determination provides the spatio-temporal segments that satisfy $0 \leq$(spatio-temporal ID)$\leq 3$ or $16 \leq$(spatio-temporal ID)$\leq 19$ as the result candidates, and records of the result candidates are acquired from the spatio-temporal data 112.

Next, in the detailed determination, the time series data of each of the spatio-temporal segments is referred to, and it is determined whether the result candidates extracted in the rough determination satisfy the search conditions. In the example illustrated in FIG. 24, all the records extracted in the rough determination satisfy the conditions, and hence all the result candidates are maintained as final results.

In the example illustrated in FIG. 24, the attribute values at the times t=50 and t=150 are determined. However, the data at the time t=50 is not included in the time series data and hence is interpolated. Specifically, the linear interpolation is performed based on the attribute values before and after the time t=50. For example, for the spatio-temporal data having the object ID of 1, the linear interpolation is performed by using the time series data of (0, 10, 10) and the time series data of (75, 10, 25) to calculate the time series data (50, 10, 20).

The time series data as the search result is in the form of a list having the time and the coordinates of the point as elements, and is grouped together for each object ID. In the example illustrated in FIG. 24, the temporal condition is the time period, and hence the time series data of each of the object IDs includes the attribute values corresponding to the start time and the end time, the input time series data (attribute values at the time t=75), and the time series data (attribute values at the time t=100 between the start time and the end time) of the records acquired in the rough determination.

Third Embodiment

Next, a third embodiment of this invention is described. In the third embodiment of this invention, both grid time series data and point time series data may be processed, and intersection test processing for correlating both the data is performed.

Figures 25A, 25B:
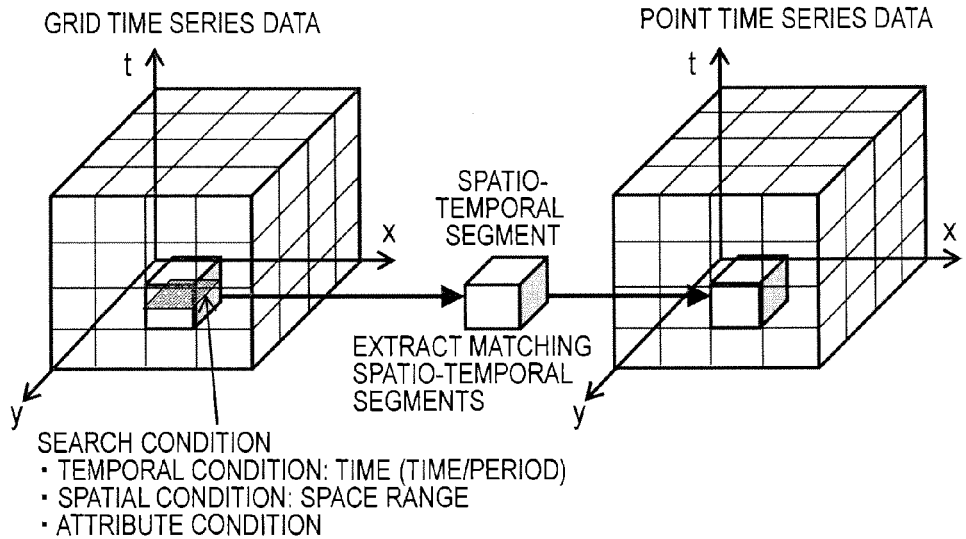
FIGS. 25A and 25B are diagrams illustrating an outline of an intersection test for different kinds of spatio-temporal data according to a third embodiment of this invention.

FIGS. 25A and 25B are diagrams illustrating an outline of an intersection test for different kinds of spatio-temporal data according to the third embodiment of this invention.

In the intersection test for the spatio-temporal data, the grid time series data and the point time series data are correlated to determine whether the search conditions (temporal condition, spatial condition, and attribute condition) are satisfied.

To be specific, at the time of rough determination, as illustrated in FIG. 25A, the spatio-temporal ID (when a condition of an attribute value is specified, the attribute value MIN and the attribute value MAX) is used to extract the spatio-temporal segments of the grid time series data that are consistent with the search conditions. Then, the extracted spatio-temporal segments of the grid time series data and the spatio-temporal segments of the point time series data are correlated to each other.

Then, at the time of detailed determination, as illustrated in FIG. 25B, the time series data of each table is referred to, and it is determined whether the time series data satisfies the search conditions.

For example, in a case where the grid time series data is water level simulation data and the point time series data is simulation data of moving objects (for example, people), at a particular time point (or time period) and in a particular space range, a search is performed to acquire, when the attribute condition satisfies a water depth of 1 meter or more, data on the moving objects (that is, people affected by the flood) included in the spatio-temporal segments of the water level simulation data.

To be specific, the determination is executed in the following steps:

(1) in the rough determination, a set st of spatio-temporal IDs that satisfy the temporal condition t, a spatial condition g, and an attribute condition a;

(2) in the rough determination, point time series data corresponding to the set st of spatio-temporal IDs is acquired; and (3) in the detailed determination, point time series data that satisfies the temporal condition t and the spatial condition g is acquired.

FIGS. 26A and 26B are diagrams illustrating an example of the intersection test for a case where the different kinds of spatio-temporal data have the same segment granularity of the spatio-temporal regions, and illustrates an example of the intersection test of the grid time series data illustrated in FIG. 9 and the point time series data illustrated in FIG. 20.

In the example illustrated in FIGS. 26A and 26B, the search conditions include the temporal condition of t=50, the spatial condition of the rectangle having (x, y)=(0, 0) to (50, 50), and the attribute condition of (attribute value of grid time series data)$\leq 1$. The search result is constituted of a set of the object ID and the point time series data.

First, in the rough determination, as illustrated in FIG. 26A, the search conditions are converted to a search range of the spatio-temporal IDs. This conversion may be calculated by using the time and the space range of the search conditions and referring to the spatio-temporal management data (FIG. 7) (the method described with reference to FIG. 5 is used). In the example illustrated in FIG. 26A, in the rough determination, records which satisfy 0≤(spatio-temporal ID of grid time series data)≤3, and in which the spatio-temporal ID of the grid time series data and the spatio-temporal ID of the point time series data are identical, and which satisfy (attribute value MIN of grid time series data)≤1 are acquired as the result candidates from the spatio-temporal data 112.

Next, in the detailed determination, as illustrated in FIG. 26B, the grid time series data is referred to, and the attribute value at the time t=50 is calculated by the linear interpolation. The attribute values at t=50 calculated for all the records extracted in the rough determination satisfy the attribute condition, and hence all the result candidates are maintained as final results.

Thereafter, deduplication processing for deleting the same time series data with the same object ID is executed to generate the search results.

The time series data as the search result is in the form of a list having the time and the coordinates of the point as elements. In the example illustrated in FIGS. 26A and 26B, the temporal condition is the time, and hence the point time series data of each of the object IDs includes only one element.

Next, a case where the grid time series data and the point time series data have different segment granularities of the spatio-temporal regions is described.

First, before an example of the intersection test is described, data used in the intersection test is described.

FIG. 27A is a diagram illustrating an example of the spatio-temporal management data 111 according to the third embodiment of this invention. The spatio-temporal management data 111 of the point time series data in the third embodiment includes the fields of data name, management parameter, and value. The spatio-temporal management data 111 in the third embodiment is different from the spatio-temporal management data 111 (FIG. 19) in the second embodiment described above in that the x-axis unit segment width and the y-axis unit segment width are 50, and is similar to the spatio-temporal management data 111 in the second embodiment described above in other points. Therefore, detailed description thereof is omitted.

FIG. 27B is a diagram illustrating an example of the spatio-temporal IDs given to the spatio-temporal segments according to the third embodiment of this invention, and illustrates the spatio-temporal IDs of the spatio-temporal segments to which the spatio-temporal management data 111 illustrated in FIG. 27A is applied.

As illustrated in FIG. 27B, the spatio-temporal segments at the times t of 0 to 100 are given the spatio-temporal IDs of 0 to 3. The spatio-temporal IDs are given by using the Z order as described above. In the same manner, the spatio-temporal segments at the times t of 100 to 200 are given the spatio-temporal IDs of 4 to 7, and the spatio-temporal segments at the times t of 200 to 300 are given the spatio-temporal IDs of 8 to 11.

FIG. 27C is a diagram illustrating a configuration example of the spatio-temporal data 112 to which the point time series data is registered according to the third embodiment of this invention.

The spatio-temporal data 112 illustrated in FIG. 27C is generated by application of the definitions of the spatio-temporal management data 111 illustrated in FIG. 27A to the point time series data illustrated in FIG. 17A.

As illustrated in FIG. 27C, the spatio-temporal data (point time series data) 112 includes the fields of spatio-temporal ID, object ID, and time series data (time, coordinates) and is constituted of the spatio-temporal table in the form of a table, for example. It should be noted that the time series data may include the attribute values as well as the time and the coordinates. In this case, the spatio-temporal table may include the minimum value and the maximum value (attribute value MIN and attribute value MAX) of the attribute values. The attribute value MIN and the attribute value MAX are as defined in the spatio-temporal data 112 (FIG. 9) in the first embodiment described above.

With reference to FIGS. 28A and 28B, the intersection test for the case where the different kinds of spatio-temporal data have different segment granularities of the spatio-temporal regions is described. FIGS. 28A and 28B illustrate an example of the intersection test of the grid time series data illustrated in FIG. 9 and the point time series data illustrated in FIG. 27C.

In the example illustrated in FIGS. 28A and 28B, the search conditions include the temporal condition of t=50, the spatial condition of the rectangle having (x, y)=(0, 0) to (50, 50), and the attribute condition of (attribute value of grid time series data)≤1. The search result is constituted of a set of the object ID and the point time series data.

First, in the rough determination, as illustrated in FIG. 28A, the search conditions are converted to a search range of the spatio-temporal IDs. This conversion may be calculated by using the time and the space range of the search conditions and referring to the spatio-temporal management data (FIG. 7) (the method described with reference to FIG. 5 is used). In the example illustrated in FIG. 28A, in the rough determination, records which satisfy 0≤(spatio-temporal ID of grid time series data)≤3, and in which (spatio-temporal ID of grid time series data & $[00001111]_2$)/4 and (spatio-temporal ID of point time series data & $[00001111]_2$) are identical, and which satisfy (attribute value MIN of grid time series data)≤1 are acquired as the result candidates from the spatio-temporal data 112.

In the rough determination, with the condition that (spatio-temporal ID of grid time series data & $[00001111]_2$)/4 and (spatio-temporal ID of point time series data & $[00001111]_2$) are identical, the spatio-temporal ID of the grid time series data and the spatio-temporal ID of the point time series data are associated with each other. In this case, "&" represents a bit product, and bits of the spatio-temporal ID that are assigned to time are masked to calculate a spatial ID. Moreover, the segment granularity of the spatio-temporal region of the grid time-series is 4 times finer than the segment granularity of the spatio-temporal region of the point time-series, and hence the spatio-temporal ID (spatial ID portion) of the grid time series data is divided by 4.

As in this example, when segment lines of the point time series data and segment lines of the grid time series data coincide and the segment widths of the axes are in the relationship of a multiple of 2n, through division by 2 times 2n, the spatio-temporal IDs of the grid time series data and the spatio-temporal IDs of the point time series data may be correlated.

Next, in the detailed determination, as illustrated in FIG. 28B, the grid time series data is referred to, and the attribute value at the time t=50 is calculated by the linear interpolation. The attribute values at t=50 calculated for all the records extracted in the rough determination satisfy the attribute condition, and hence all the result candidates are maintained as final results.

Thereafter, the deduplication processing for deleting the same time series data with the same object ID is executed to generate the search results.

The time series data as the search result is in the form of a list having the time and the coordinates of the point as elements. In the example illustrated in FIGS. 28A and 28B, the temporal condition is the time, and hence the point time series data of each of the object IDs includes only one element.

As described above, according to the embodiments of this invention, the spatio-temporal data may be grouped together in units of the spatio-temporal segment, to thereby reduce the data amount of the substantial data. In addition, the spatio-temporal IDs, which are the one-dimensional integer values, are assigned to the spatio-temporal segments, and hence the data amount of the index data may be reduced.

Moreover, the spatio-temporal IDs are assigned taking temporal and spatial proximity of the spatio-temporal segments into consideration and the spatio-temporal data is stored in order of the spatio-temporal IDs, and hence in the spatio-temporal data search processing, the substantial data may be acquired quickly so that the search may be speeded up. Further, the spatio-temporal IDs are assigned in the same time period in order from the closest spatial distance, that is, with the emphasis on the spatial proximity with higher search frequency, and hence the search may be speeded up more.

In addition, in one spatio-temporal segment, the spatio-temporal data is registered on the boundary of the segments, and hence a data configuration may be adopted in which the continuous change with time of the spatio-temporal data is taken into consideration. Through the knowledge of the data range in the spatio-temporal segment, the search processing may be performed at high speed. Moreover, each of the spatio-temporal segments has the maximum value and the minimum value of the data as the attributes, and hence even when the search condition is specified with an attribute, the search processing may be performed at high speed.

In addition, the rough determination is performed by calculating the spatio-temporal IDs from the temporal condition and the spatial condition at the time of the search processing, and comparing the attribute condition with at least one of the attribute value MIN and the attribute value MAX to extract the result candidates, and the detailed determination for extracting the search results is performed by matching the time series data and the search conditions of the result candidates. Therefore, the number of records from which the spatio-temporal data is read may be reduced so that the search processing may be performed at high speed.

In addition, the plurality of pieces of spatio-temporal data are correlated in units of the spatio-temporal segment, and hence the intersection test in which the plurality of pieces of spatio-temporal data are related may be performed.

While the present invention has been described in detail and pictorially in the accompanying drawings, the present invention is not limited to such detail but covers various obvious modifications and equivalent arrangements, which fall within the purview of the appended claims.

What is claimed is:

1. A spatio-temporal data management system for managing time series data associated with a spatio-temporal region, comprising:
   a processor configured to execute a program;
   a memory for storing the program; and
   a storage device for storing the time series data, wherein the processor is configured to:
   segment the spatio-temporal region in time and space to generate a plurality of spatio-temporal segments;
   assign, in consideration of temporal and spatial proximity of the plurality of spatio-temporal segments, identifiers for uniquely identifying the plurality of spatio-temporal segments, each of the identifiers being expressed with a one-dimensional integer value, wherein:
      the identifiers of a first set of values that are smaller than a second set of values are assigned to spatio-temporal segments of a first period of time that is older than a second period of time to which the identifiers of the second set of values are assigned, and
      for spatio-temporal segments of an identical period of time, the identifiers of close values are assigned to spatio-temporal segments that are close in spatial distance; and
   determine an arrangement of the time series data such that pieces of data of spatio-temporal segments that are close in the assigned identifiers are arranged close on the storage device.

2. The spatio-temporal data management system according to claim 1, wherein the processor is configured to associate time series data on a boundary of each of the plurality of spatio-temporal segments with the each of the plurality of spatio-temporal segments.

3. The spatio-temporal data management system according to claim 2, wherein the processor is configured to generate the time series data on the boundary of the each of the plurality of spatio-temporal segments by linear interpolation.

4. The spatio-temporal data management system according to claim 1,
   wherein the time series data includes grid time series data including at least one piece of data in the plurality of spatio-temporal segments, and point time series data including at least one spatial coordinate in the plurality of spatio-temporal segments,
   wherein the processor is configured to:
   assign one of a common identifier and correlated identifiers to the grid time series data and the point time series data, and specify the one of the common identifier and the correlated identifiers to search the grid time series data and the point time series data in association with each other.

5. The spatio-temporal data management system according to claim 1,
   wherein the processor is configured to search the time series data in a first determination step and a second determination step,
   wherein, in the first determination step, the processor is configured to calculate identifiers of spatio-temporal segments satisfying search conditions of time and space, and extract the spatio-temporal segments corresponding to the calculated identifiers as result candidates, and
   wherein, in the second determination step, the processor is configured to match the time series data associated with the spatio-temporal segments extracted as the result candidates and the search conditions, to thereby generate search results.

6. The spatio-temporal data management system according to claim 5,
   wherein data of the plurality of spatio-temporal segments includes a maximum value and a minimum value of the time series data within the plurality of spatio-temporal segments, and wherein, in the first determination step, the processor is configured to:
compare search conditions of the time series data with at least one of the maximum value and the minimum value of the time series data; and
extract spatio-temporal segments which correspond to the calculated identifiers and satisfy the search conditions of the time series data as the result candidates.

7. A spatio-temporal data management method to be executed by a computer system for managing time series data associated with a spatio-temporal region, the computer system including a processor for executing a program, a memory for storing the program, and a storage device for storing the time series data, the spatio-temporal data management method including steps of:
segmenting, by the processor, the spatio-temporal region in time and space to generate a plurality of spatio-temporal segments;
assigning, by the processor, in consideration of temporal and spatial proximity of the plurality of spatio-temporal segments, identifiers for uniquely identifying the plurality of spatio-temporal segments, each of the identifiers being expressed with a one-dimensional integer value, wherein:
the identifiers of a first set of values that are smaller than a second set of values are assigned to spatio-temporal segments of a first period of time that is older than a second period of time to which the identifiers of the second set of values are assigned, and
for the spatio-temporal segments of an identical period of time, the identifiers of close values are assigned to spatio-temporal segments that are close in spatial distance; and
determining, by the processor, an arrangement of the time series data such that pieces of data of spatio-temporal segments that are close in the assigned identifiers are arranged close on the storage device.

8. The spatio-temporal data management method according to claim 7, including a step of associating, by the processor, time series data on a boundary of each of the plurality of spatio-temporal segments with the each of the plurality of spatio-temporal segments.

9. The spatio-temporal data management method according to claim 8, including a step of generating, by the processor, the time series data on the boundary of the each of the plurality of spatio-temporal segments by linear interpolation.

10. The spatio-temporal data management method according to claim 7,
wherein the time series data includes grid time series data including at least one piece of data in the plurality of spatio-temporal segments, and point time series data including at least one spatial coordinate in the plurality of spatio-temporal segments, and
wherein the spatio-temporal data management method includes steps of:
assigning, by the processor, one of a common identifier and correlated identifiers to the grid time series data and the point time series data; and
specifying, by the processor, the one of the common identifier and the correlated identifiers to search the grid time series data and the point time series data in association with each other.

11. The spatio-temporal data management method according to claim 7, including a step of searching, by the processor, the time series data in a first determination step and a second determination step,
wherein in the first determination step, the processor calculates identifiers of spatio-temporal segments satisfying search conditions of time and space, and extract the spatio-temporal segments corresponding to the calculated identifiers as result candidates, and
wherein in the second determination step, the processor matches the time series data associated with the spatio-temporal segments extracted as the result candidates and the search conditions, to thereby generate search results.

12. The spatio-temporal data management method according to claim 11,
wherein data of the plurality of spatio-temporal segments includes a maximum value and a minimum value of the time series data within the plurality of spatio-temporal segments, and
wherein the first determination step includes a step of:
comparing, by the processor, search conditions of the time series data with at least one of the maximum value and the minimum value of the time series data; and
extracting, by the processor, spatio-temporal segments which correspond to the calculated identifiers and satisfy the search conditions of the time series data as the result candidates.

13. A non-transitory machine-readable storage medium, containing at least one sequence of instructions for controlling a computer system for managing time series data associated with a spatio-temporal region, the computer system including a processor for executing a program, a memory for storing the program, and a storage device for storing the time series data, the instructions that, when executed, causes the computer system to:
segment the spatio-temporal region in time and space to generate a plurality of spatio-temporal segments;
assign, in consideration of temporal and spatial proximity of the plurality of spatio-temporal segments, identifiers for uniquely identifying the plurality of spatio-temporal segments, each of the identifiers being expressed with a one-dimensional integer value, wherein:
the identifiers of a first set of values that are smaller than a second set of values are assigned to spatio-temporal segments of a first period of time that is older than a second period of time to which the identifiers of the second set of values are assigned, and
for the spatio-temporal segments of an identical period of time, the identifiers of close values are assigned to spatio-temporal segments that are close in spatial distance; and
determine an arrangement of the time series data such that pieces of data of spatio-temporal segments that are close in the assigned identifiers are arranged close on the storage device.

* * * * *